United States Patent
Kurita et al.

(10) Patent No.: US 9,005,504 B2
(45) Date of Patent: Apr. 14, 2015

(54) METHOD OF MANUFACTURING RESIN MOLDED ELECTRONIC COMPONENT

(75) Inventors: Junichi Kurita, Osaka (JP); Hiroshi Takahashi, Kyoto (JP); Kenji Kuranuki, Kyoto (JP); Motoaki Morioka, Osaka (JP); Keizo Nakagawa, Osaka (JP); Masashi Minakuchi, Hyogo (JP); Yukihiro Shimasaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1057 days.

(21) Appl. No.: 13/056,702

(22) PCT Filed: Jun. 17, 2010

(86) PCT No.: PCT/JP2010/004029
§ 371 (c)(1),
(2), (4) Date: Jan. 31, 2011

(87) PCT Pub. No.: WO2010/146860
PCT Pub. Date: Dec. 23, 2010

(65) Prior Publication Data
US 2011/0127694 A1    Jun. 2, 2011

(30) Foreign Application Priority Data

Jun. 17, 2009  (JP) .................................. 2009-143850
Sep. 15, 2009  (JP) .................................. 2009-212591
Dec. 7, 2009   (JP) .................................. 2009-277300

(51) Int. Cl.
*B29C 43/18*    (2006.01)
*B29C 39/00*    (2006.01)
(Continued)

(52) U.S. Cl.
CPC ........... *B29C 43/18* (2013.01); *B29C 2043/182* (2013.01); *B29C 70/70* (2013.01); *B29C 2043/181* (2013.01); *B29C 70/72* (2013.01); *B29C 39/006* (2013.01); *B29C 39/10* (2013.01); *B29C 39/38* (2013.01); *B29C 39/405* (2013.01); *B29K 2023/38* (2013.01); *B29K 2105/0002* (2013.01); *H01G 9/012* (2013.01);
(Continued)

(58) Field of Classification Search
USPC ............... 264/272.13, 272.15, 275, 279, 327
See application file for complete search history.

(56) References Cited

U.S. PATENT DOCUMENTS 4,432,928 A  *  2/1984  Barnard et al. ................ 264/519
H559 H  *  12/1988  Brown .......................... 264/102
(Continued)

FOREIGN PATENT DOCUMENTS

JP    02-017318 U    2/1990
JP    2-31130 U      2/1990
(Continued)

*Primary Examiner* — Atul P. Khare
(74) *Attorney, Agent, or Firm* — RatnerPrestia

(57) ABSTRACT

A method of manufacturing a resin molded electronic component using a first mold having a cavity with an open top surface and a second mold combined with the first mold on top includes the following steps: (A) inserting a element of the electronic component and a liquid resin precursor into the cavity of the first mold, the liquid resin precursor having viscosity of 10 Pa·s or lower at 40° C.; (B) arranging the second mold such that the element and the resin precursor are sandwiched after the step (A); and (C) pressing the element and the resin precursor between the first mold and the second mold, and curing the resin precursor by heat from the second mold after the step (B). A temperature of the second mold is set to be higher than that of the first mold.

16 Claims, 28 Drawing Sheets

(51) Int. Cl.
*B29C 39/10* (2006.01)
*B29C 39/38* (2006.01)
*B29C 39/40* (2006.01)
*H01G 9/012* (2006.01)
*H01G 9/10* (2006.01)
*H01G 9/15* (2006.01)
*H01G 13/00* (2013.01)
*H01G 4/224* (2006.01)
*B29C 70/70* (2006.01)
*B29C 70/72* (2006.01)
*B29K 23/00* (2006.01)
*B29K 105/00* (2006.01)

(52) U.S. Cl.
CPC *H01G 9/10* (2013.01); *H01G 9/15* (2013.01); *H01G 13/003* (2013.01)

(56) References Cited

U.S. PATENT DOCUMENTS

| | | | |
|---|---|---|---|
| 6,080,354 A * | 6/2000 | Miyajima | 264/511 |
| 6,268,106 B1 | 7/2001 | Park et al. | |
| 6,977,188 B2 * | 12/2005 | Takase | 438/106 |
| 7,348,220 B2 * | 3/2008 | Ito et al. | 438/127 |
| 8,105,524 B2 * | 1/2012 | Yamada et al. | 264/272.11 |
| 8,411,416 B2 * | 4/2013 | Kurita et al. | 361/535 |
| 2007/0244267 A1 | 10/2007 | Dueber et al. | |
| 2009/0127732 A1 | 5/2009 | Tamura | |
| 2010/0091425 A1 | 4/2010 | Takeoka et al. | |

FOREIGN PATENT DOCUMENTS

| | | |
|---|---|---|
| JP | 06-177190 A | 6/1994 |
| JP | 06-177190 A | 6/1994 |
| JP | 11-277594 A | 10/1999 |
| JP | 2000-098615 A | 4/2000 |
| JP | 2001-088170 A | 4/2001 |
| JP | 2001-088170 A | 4/2001 |
| JP | 2001-254003 A | 9/2001 |
| JP | 2007-327035 A | 12/2007 |
| JP | 2008-159723 A | 7/2008 |
| JP | 2009-124012 A | 6/2009 |
| WO | WO 03/057777 A1 | 7/2003 |
| WO | WO 2007/064777 A2 | 6/2007 |
| WO | WO 2008078491 A1 * | 7/2008 |
| WO | PCT/JP2010/004029 | 9/2010 |

* cited by examiner

ND OF MANUFACTURING RESIN
METHOD OF MANUFACTURING RESIN MOLDED ELECTRONIC COMPONENT

This application is a U.S. National Phase Application of PCT International Application PCT/JP2010/004029.

TECHNICAL FIELD

The present invention relates to a method of manufacturing a resin molded electronic component used for various electronic devices, electrical apparatuses, industrial instruments, automobiles, and the like.

BACKGROUND ART

FIG. 37 is a perspective view showing a mold set used for forming an exterior packaging body of a conventional resin molded capacitor. Mold set 120 for resin-molding includes upper mold 121 and lower mold 122. Upper mold 121 is provided with gate 123 through which an uncured resin is injected. Further, upper mold 121 and lower mold 122 are provided with air vent hole 124 in mating surfaces thereof for removing air when injecting a resin.

In order to mold the exterior packaging body, first, capacitor element 126 to which clasps 125 are connected is placed on lower mold 122. At this time, capacitor element 126 can be accurately positioned in lower mold 122 by fitting clasps 125 into recesses 127 in lower mold 122.

Next, upper mold 121 is fastened to lower mold 122, and an uncured resin is injected through gate 123. As the resin, it is preferable to use a norbornene based resin. As the norbornene based resin can be cured in a short period of time, it is possible to manufacture a resin molded capacitor with excellent productivity. It is preferable that temperatures of upper mold 121 and lower mold 122 are within a range from 50° C. to 120° C. such that a curing reaction of the norbornene based resin progresses.

Thereafter, mold set 120 is opened, and, as shown in FIG. 38, resin molded capacitor 129 is produced over which exterior packaging body 128 is molded. Such a technique is disclosed in Patent Document 1, for example.

As described above, the norbornene based resin yields high productivity as it is cured in a short period of time. However, there is often a case in which the norbornene based resin is cured before it is sufficiently filled into a cavity defined by upper mold 121 and lower mold 122, as the curing speed of the norbornene based resin is too fast. Consequently, manufactured resin molded capacitor 129 often includes a portion that is not covered sufficiently by exterior packaging body 128, possibly resulting in reduced reliability.

CITATION LIST

Patent Documents

Patent Document: Unexamined Japanese Patent Publication No. 2008-159723

SUMMARY OF THE INVENTION

The present invention provides a method of manufacturing a highly reliable resin molded electronic component with excellent productivity. A method of manufacturing a resin molded electronic component according to the present invention uses a first mold having a cavity with an open top surface and a second mold that is combined with the first mold on top.

The method of manufacturing a resin molded electronic component according to the present invention includes the following steps:

(A) inserting a element of the electronic component and a liquid resin precursor into the cavity of the first mold, the liquid resin precursor having viscosity of 10 Pa·s or lower at 40° C.;

(B) arranging the second mold such that the element and the resin precursor are sandwiched the step (A); and (C) pressing the element and the resin precursor between the first mold and the second mold, and curing the resin precursor by heat from the second mold after the step (B).

Here, a temperature of the second mold is set to be higher than that of the first mold.

With the above steps according to the present invention, it is possible to manufacture a highly reliable resin molded electronic component with excellent productivity. This is because a temperature of the second mold is set to be higher than that of the first mold. Accordingly, the injected resin precursor is not easily cured in the middle of the process and spreads into every corner of the cavity. Then, the heat from the second mold is transmitted to the resin precursor and the resin precursor is cured. As a result, it is possible to manufacture a resin molded electronic component that is sufficiently covered by an exterior packaging body.

DETAILED DESCRIPTION OF THE PREFERRED EMBODIMENT

Figure 1:
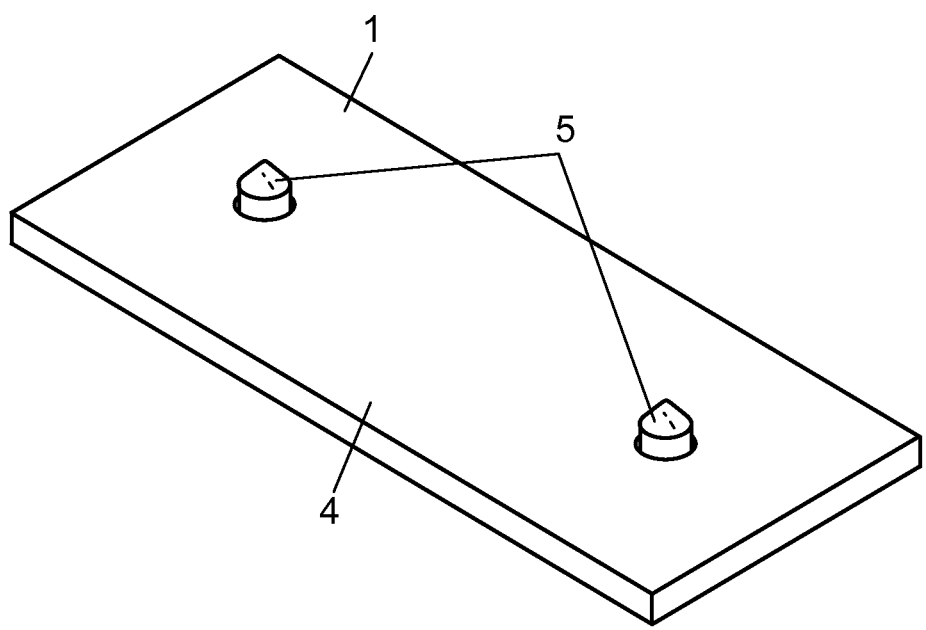
FIG. 1 is a perspective view showing a lower mold used in a method of manufacturing a resin molded capacitor according to Embodiment 1 of the present invention.

The following describes embodiments of the present invention with reference to the drawings. In the embodiments, components having like structures described in previous embodiments are denoted by same reference numerals, and some of such components may not be described in detail.
(Embodiment 1)

Figure 2A:
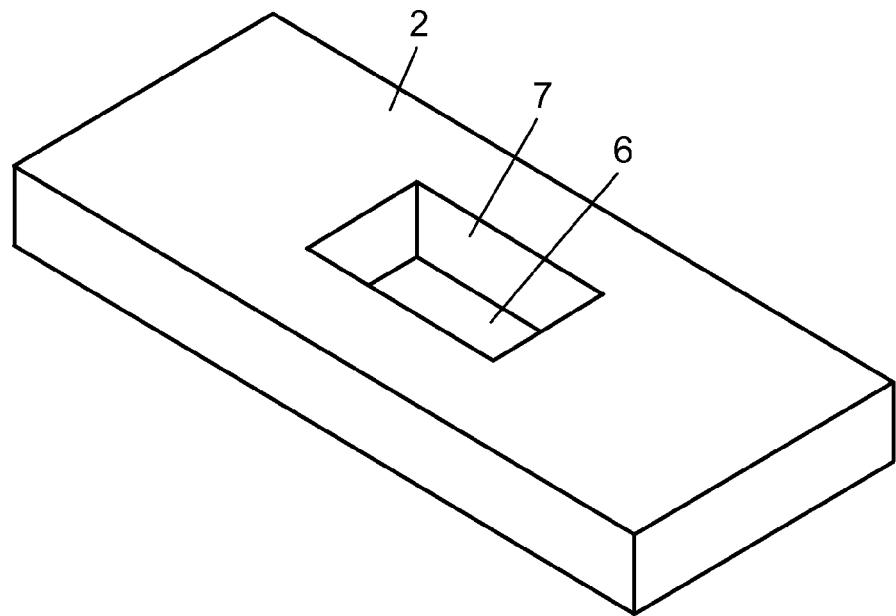
FIG. 2A is a perspective view showing a top surface of a middle mold used in the method of manufacturing a resin molded capacitor according to Embodiment 1 of the present invention.
Figure 2B:
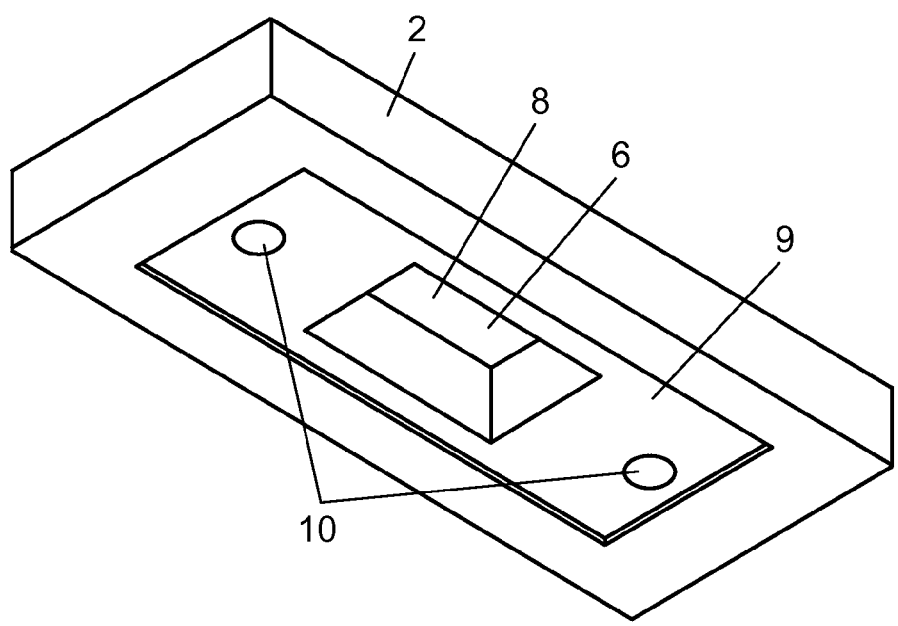
FIG. 2B is a perspective view showing a lower surface of the middle mold shown in FIG. 2A.
Figure 3:
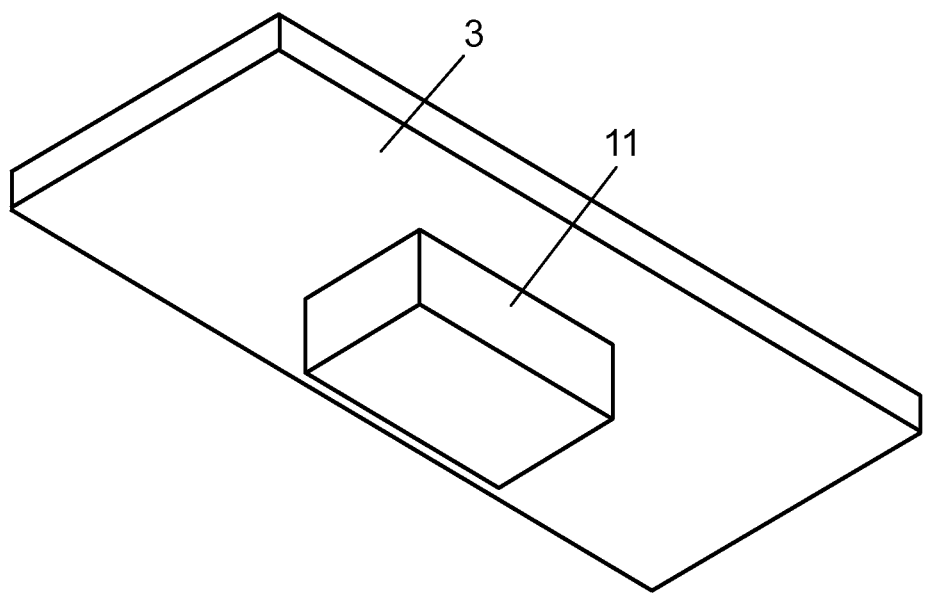
FIG. 3 is a perspective view showing an upper mold used in the method of manufacturing a resin molded capacitor according to Embodiment 1 of the present invention.

First, a structure of a mold set used in a method of manufacturing a resin molded electronic component according to Embodiment 1 of the present invention is described with reference to FIG. 1 to FIG. 3. In the following description, a capacitor is taken as an example of the electronic components. FIG. 1 is a perspective view showing an external appearance of a lower mold, FIG. 2A is a perspective view showing a top surface of a middle mold, FIG. 2B is a perspective view showing a lower surface of the middle mold, and FIG. 3 is a perspective view showing a lower surface of an upper mold. The mold set used in the method of manufacturing a resin molded capacitor in this embodiment is formed of three molds including lower mold 1, middle mold 2, and upper mold 3. By combining these three molds arranged one above the other and injecting a norbornene based resin into a cavity provided within the molds, a capacitor element laminated body is molded and an exterior packaging body is formed. The manufacturing method and a finished molded piece will be described later with reference to FIG. 4 to FIG. 12B. Here, an up-down relation between components shown in FIG. 1 to FIG. 3 corresponds to an actual up-down relation when the manufacturing method is put into practice.

As shown in FIG. 1, lower mold 1 includes planar base plate 4 and two cylindrical guiding pins 5 provided upright on a top surface of base plate 4. Guiding pins 5 are provided integrally with base plate 4, and outer circumferential edges of their top end surfaces are chamfered. This facilitates insertion into guiding holes 10 of middle mold 2 and through holes 16 of lead frame 13, which are described later. Alternatively, forming a top end of each guiding pin 5 substantially semi-spherical also facilitates the insertion into guiding holes 10 of middle mold 2 and through holes 16 of lead frame 13.

As shown in FIG. 2A, the top surface and the lower surface of middle mold 2 are in a rectangular shape that is substantially the same as that of the top surface of lower mold 1. In a central portion of middle mold 2, hollow portion 6 is provided penetrating through middle mold 2 from the top surface to the lower surface of middle mold 2, and top surface opening 7 of hollow portion 6 is rectangular.

As shown in FIG. 2B, depression 9 that is slightly depressed and surrounding lower surface opening 8 of hollow portion 6 is provided in the lower surface of middle mold 2. Depression 9 is provided in order to house therein lead frame 13 which is described later with reference to FIG. 4A. Specifically, the depth of depression 9 is substantially the same as the thickness of lead frame 13. Further, two guiding holes 10 in which guiding pins 5 described above are fitted are provided between an outer circumference of depression 9 and lower surface opening 8 of hollow portion 6.

As shown in FIG. 3, quadrangular-prismatic protrusion 11 is provided upright from the lower surface of upper mold 3, and a lower surface of protrusion 11 is rectangular. The lower surface of protrusion 11 is designed to have a shape substantially the same as and slightly smaller than top surface opening 7, such that protrusion 11 can be inserted into top surface opening 7 of hollow portion 6 of shown middle mold 2 in FIG. 2A. Although not shown in FIG. 3, the top surface of upper mold 3 is planar. However, the top surface of upper mold 3 is not particularly limited to such a shape.

Further, as a material for lower mold 1, middle mold 2, and upper mold 3 in this embodiment, stainless steel is used, but the material is not limited to this, and a metal such as iron, aluminum, or copper can be used. Any material with relatively high thermal conductivity can be suitably employed as a material for the mold set according to this embodiment.

Figure 4A:
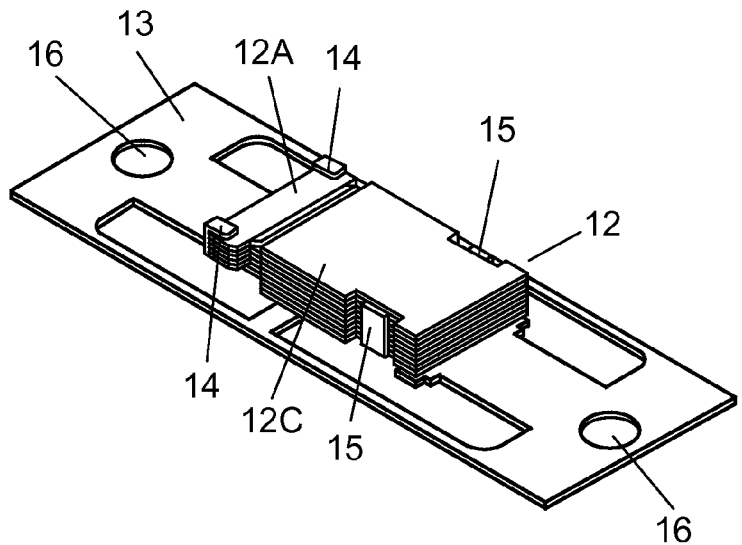
FIG. 4A is a perspective view showing a structure of a capacitor element laminated body and a lead frame used in the method of manufacturing a resin molded capacitor according to Embodiment 1 of the present invention, showing a top portion of the capacitor element laminated body to which the lead frame is connected.

Next, with reference to FIG. 4A to FIG. 4C, structures of capacitor element laminated body (hereinafter referred to as laminated body) 12 that is an element used in this embodiment and lead frame 13 are described. FIG. 4A is a perspective view showing an top portion of laminated body 12 to which lead frame 13 is connected, FIG. 4B is a perspective view showing a bottom portion of laminated body 12 to which lead frame 13 is connected, and FIG. 4C is a cross-sectional view showing capacitor element 18 that constitutes laminated body 12.

As shown in FIG. 4A, lead frame 13 has first folded portions 14 and second folded portions 15. Laminated body 12 has positive electrode 12A and negative electrode 12C. First folded portions 14 are folded onto a top surface of laminated body 12 so as to hold positive electrode 12A of laminated body 12, and fixedly connected to positive electrode 12A by resistance welding or laser welding. Second folded portions 15 are folded along side surfaces of laminated body 12 so as to hold negative electrode 12C of laminated body 12, and fixedly connected to negative electrode 12C via a conductive silver paint.

Furthermore, two circular through holes 16 are provided near both ends across long sides of lead frame 13. Through holes 16 are provided so that guiding pins 5 of lower mold 1 described above are inserted therein.

Figure 4B:
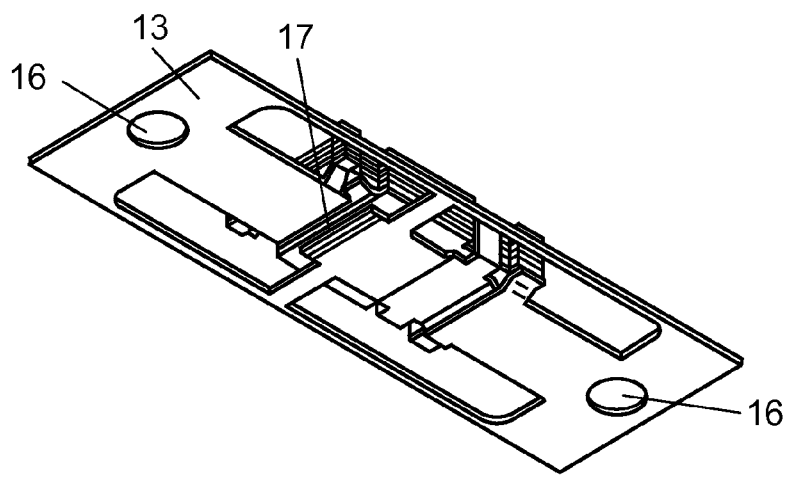
FIG. 4B is a perspective view showing a bottom portion of the capacitor element laminated body to which the lead frame is connected shown in FIG. 4A.
Figure 4C:
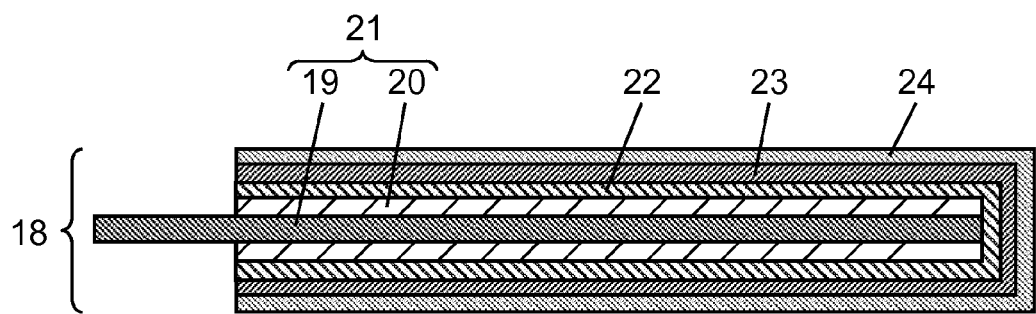
FIG. 4C is a cross-sectional view showing a capacitor element that constitutes the capacitor element laminated body shown in FIG. 4A.

As shown in FIG. 4B, a lower surface of lead frame 13 is separated at separating section 17. As will be later described, providing separating section 17 for lead frame 13 prevents a short circuit between positive terminal 29 and negative terminal 30 of the resin molded capacitor as a finished product.

Laminated body 12 is formed by laminating a plurality of capacitor elements 18 shown in FIG. 4C. Each planar capacitor element 18 has positive electrode body 21, thin film dielectric layer 22, conductive polymer layer 23, and negative electrode body 24. Positive electrode body 21 is formed of aluminum foil 19 as a valve action metal and aluminum etched layers 20 disposed on both surfaces of aluminum foil 19. Dielectric layer 22 is disposed so as to surround positive electrode body 21. Conductive polymer layer 23 made from conductive polymerer (e.g., polypyrrole) is laminated over dielectric layer 22, and sequentially, negative electrode body 24 made from a carbon and a silver paste is laminated over conductive polymer layer 23. Negative electrode 12C is formed by sequentially laminating capacitor elements 18 thus configured such that negative electrode bodies 24 of respective capacitor elements 18 are electrically connected to each other with conductive silver paints therebetween.

Aluminum foils 19 that extend in a tongue shape from respective capacitor elements 18 are bound into a single bundle, thereby forming positive electrode 12A. Here, it is possible to weld aluminum foils 19 by resistance welding or laser welding prior to the welding to first folded portion 14. Negative electrode body 24 at a lower surface of lowermost capacitor element 18 of laminated body 12 is connected to lead frame 13 via a conductive silver paint, and negative electrode bodies 24 at side surfaces of respective capacitor elements 18 are likewise connected to second folded portion 15 of lead frame 13 via a conductive silver paint.

Laminated body 12 is formed by laminating six capacitor elements 18; however it is not limited thereto. Laminated body 12 can be configured by only a single layer of capacitor element 18, or can be configured by laminating more than one capacitor element 18, and the number of capacitor elements 18 that constitute laminated body 12 is in no way restricted.

Figure 5:
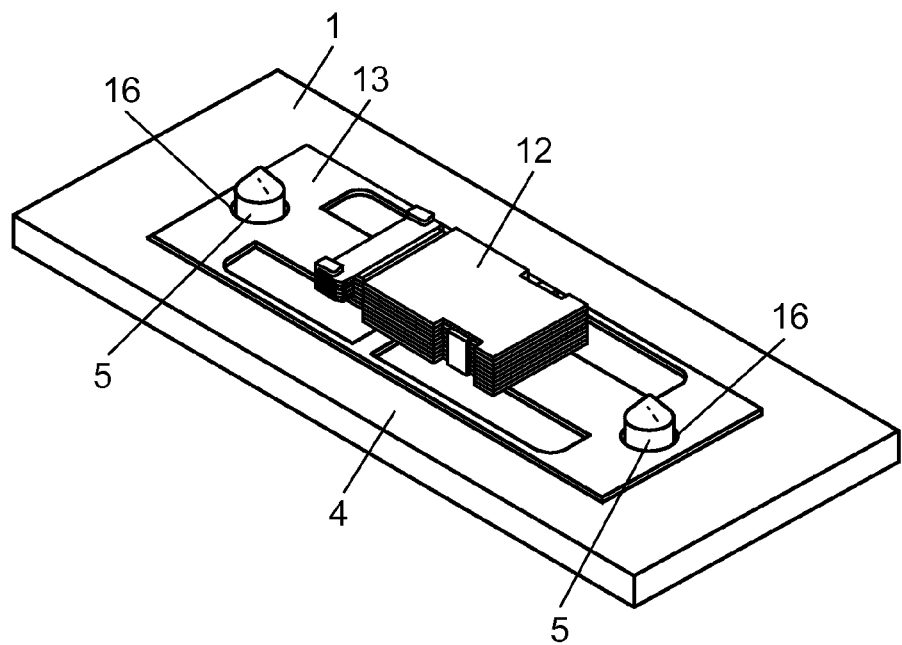
FIG. 5 is a perspective view showing a first step in the method of manufacturing a resin molded capacitor according to Embodiment 1 of the present invention.
Figure 6:
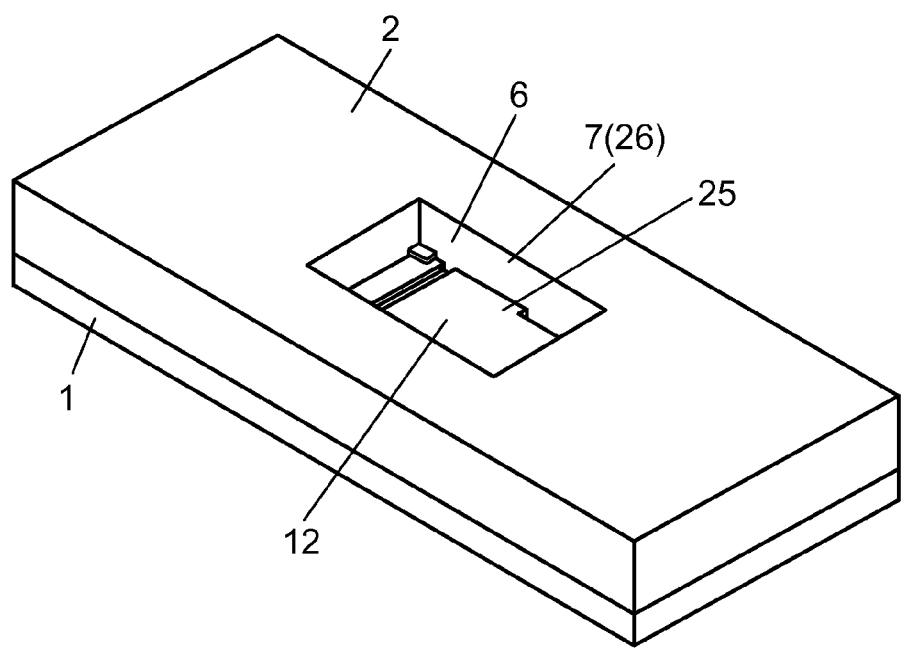
FIG. 6 is a perspective view showing a second step following the first step shown in FIG. 5.
Figure 7:
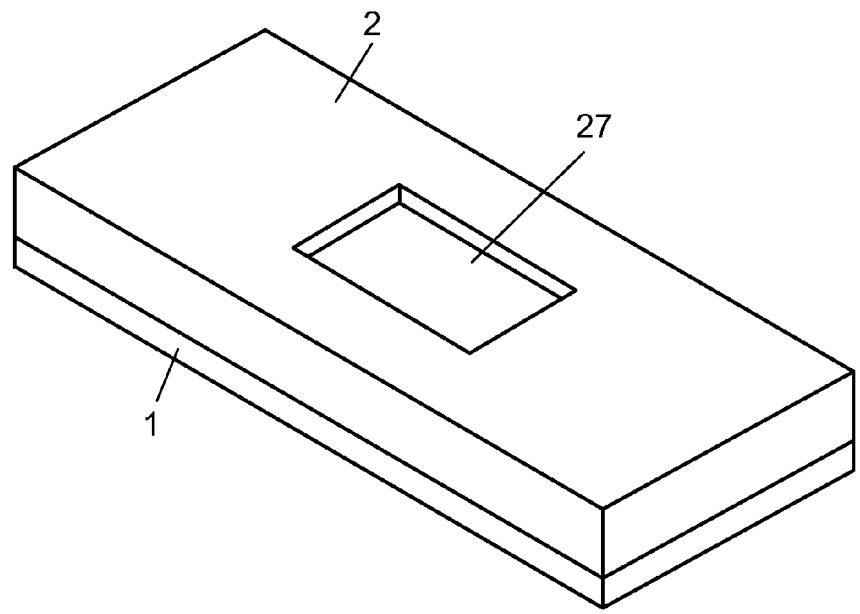
FIG. 7 is a perspective view showing a third step following the second step shown in FIG. 6.
Figure 8:
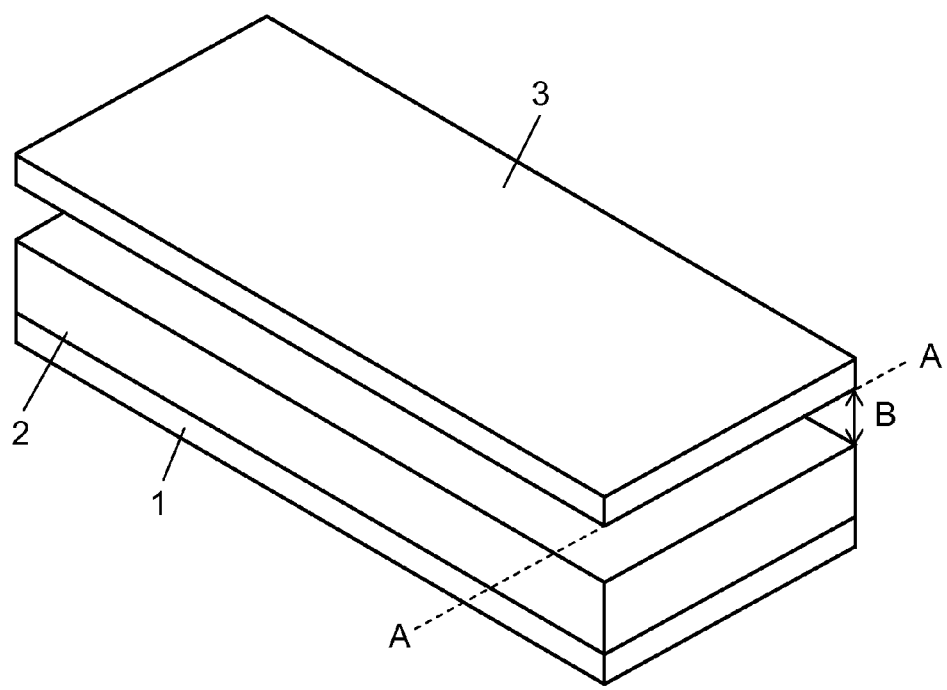
FIG. 8 is a perspective view showing a fourth step following the third step shown in FIG. 7.
Figure 9:
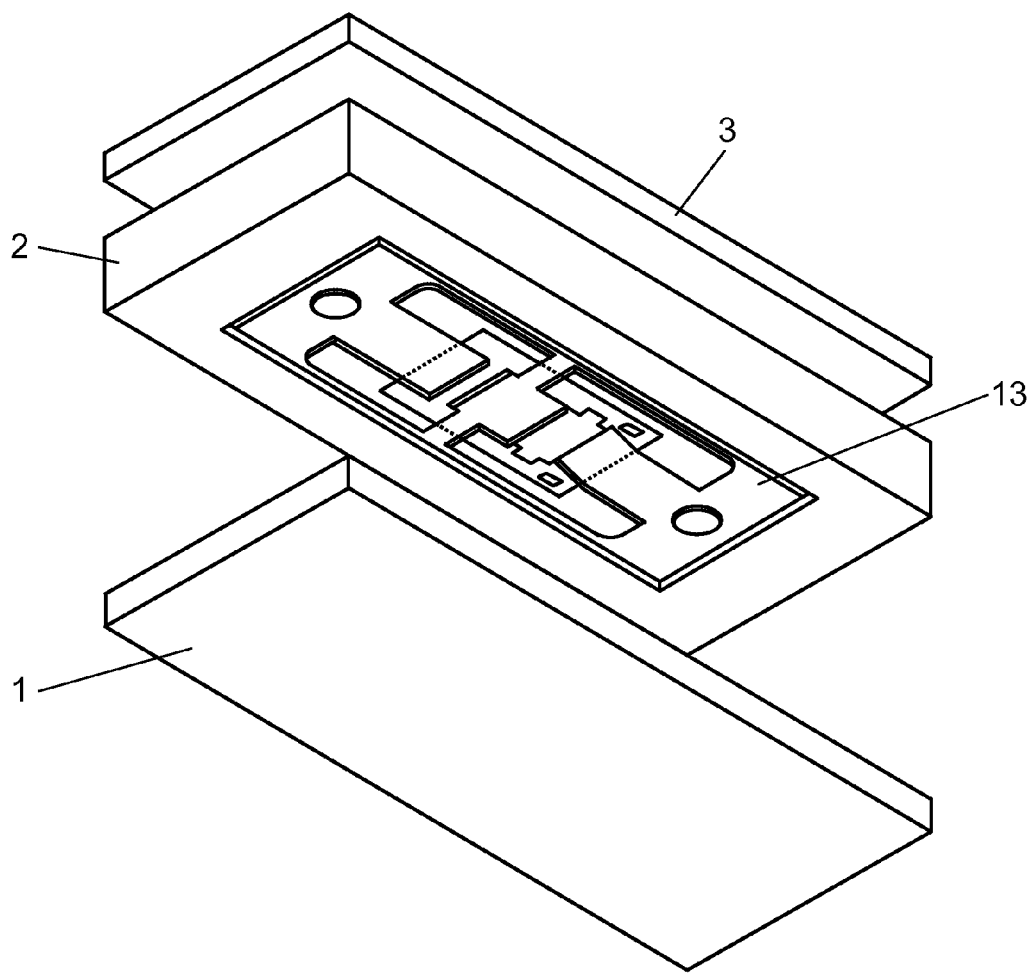
FIG. 9 is a perspective view showing a fifth step following the fourth step shown in FIG. 8.
Figure 10:
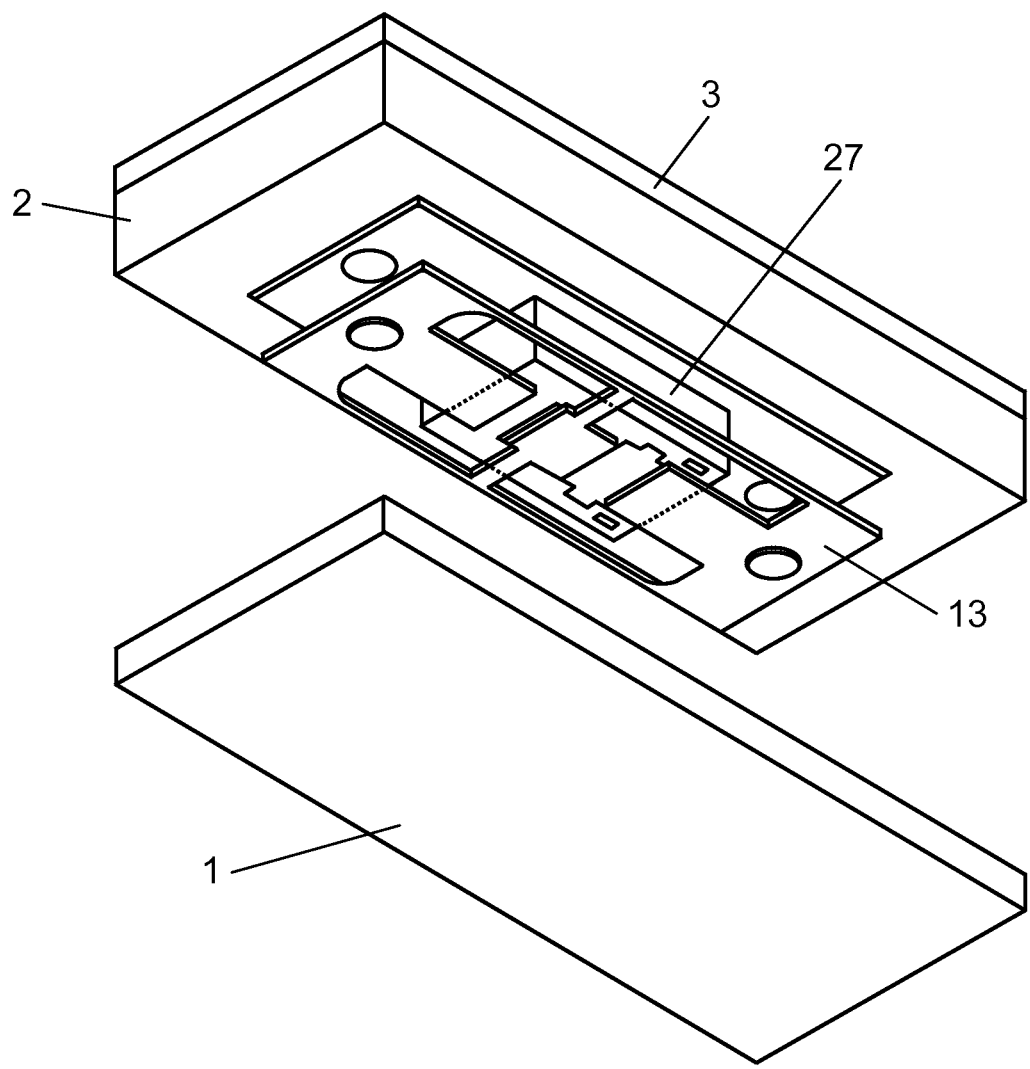
FIG. 10 is a perspective view showing a sixth step following the fifth step shown in FIG. 9.
Figure 11:
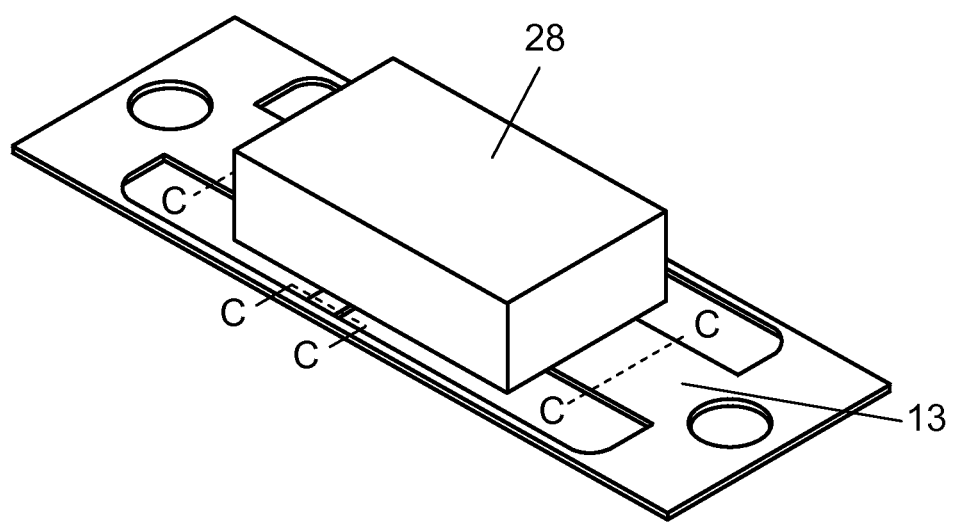
FIG. 11 is a perspective view showing the capacitor element laminated body covered with an exterior packaging body by the method of manufacturing a resin molded capacitor according to Embodiment 1 of the present invention.

Next, the method of manufacturing a resin molded capacitor according to this embodiment is described with reference to FIG. 5 to FIG. 11. FIG. 5 shows a first step, FIG. 6 shows a second step, FIG. 7 shows a third step, FIG. 8 shows a fourth step, FIG. 9 shows a fifth step, and FIG. 10 shows a sixth step. FIG. 11 shows laminated body 12 to which molding of the exterior packaging body has been performed and taken out of the mold set after the sixth step.

As shown in FIG. 5, first, in the first step, laminated body 12 provided on lead frame 13 and connected therewith is placed on base plate 4 of lower mold 1. At this time, the lower surface of lead frame 13 and the top surface of base plate 4 are joined such that lead frame 13 comes under laminated body 12. Then, guiding pins 5 provided on the top surface of lower mold 1 are inserted into through holes 16 of lead frame 13, and thus the placement is done. By this operation, lead frame 13 and laminated body 12 are accurately positioned at predetermined positions. Although more than two guiding pins 5 can be provided, it is possible to accurately position lead frame 13 and laminated body 12 on lower mold 1 by providing at least two guiding pins 5.

Further, in the first step, at the same time as laminated body 12 is placed on lower mold 1, lower mold 1 is heated in advance using a heater. Temperature T1 of lower mold 1 is set in a range from 40° C. to 60° C. As one example of a heating method, there is a method of adjusting the temperature of lower mold 1 by providing a hole having diameter of 10 mm or so (not depicted) in a side surface of lower mold 1, inserting a rod-shaped cartridge heater into this hole, and heating. This embodiment employs the above method; however the method is not limited thereto and it is possible to use a method, for example, of externally heating by a heater, or of embedding a heater in lower mold 1 and automatically adjusting the temperature.

In the second step, as shown in FIG. 6, middle mold 2 is attached to lower mold 1. At this time, middle mold 2 is attached such that laminated body 12 is accommodated in hollow portion 6 of middle mold 2. As described above, middle mold 2 and lower mold 1 constitute a first mold including hollow portion 6 that is a cavity with an open top surface.

As shown in FIG. 2B, the lower surface of middle mold 2 is provided with guiding holes 10. Lower mold 1 and middle mold 2 are designed such that laminated body 12 is naturally accommodated within hollow portion 6 by attaching middle mold 2 to lower mold 1 such that guiding pins 5 that project from through holes 16 of lead frame 13 are fitted into guiding holes 10. Further, the lower surface of middle mold 2, that is, the mating surface with lower mold 1 is provided with depression 9 as shown in FIG. 2B. Accordingly, lead frame 13 is fitted into depression 9. At this time, lead frame 13 is sandwiched between the top surface of lower mold 1 and a surface of depression 9, and the both surfaces of lead frame 13 are substantially in close contact with the top surface of lower mold 1 and the surface of depression 9, respectively.

Further, similarly to lower mold 1 in the first step, middle mold 2 is heated in advance in the second step, and temperature T2 of middle mold 2 is set in a range from 60° C. to 80° C. Middle mold 2 is heated using the method similar to that used for lower mold 1.

As described above, by going through the second step, laminated body 12 is contained in cavity 25 having an open top surface that is defined by the top surface of lower mold 1 and hollow portion 6 of middle mold 2. As can be seen from FIG. 6, open top surface 26 of cavity 25 corresponds to top surface opening 7 of middle mold 2.

In the third step, as shown in FIG. 7, a specific amount of uncured norbornene based resin 27 is injected into cavity 25 from open top surface 26 using such as a nozzle. Specifically, in the third step, laminated body 12 as an element of an electronic component and norbornene based resin 27 as a liquid resin precursor containing norbornene monomer are inserted into cavity 25 of the first mold. In this case, the injection of norbornene based resin 27 is finished at a predetermined level slightly lower than a top end of cavity 25 so as to prevent norbornene based resin 27 from overflowing from cavity 25.

As described above, the both surfaces of lead frame 13 are substantially in close contact with the top surface of lower mold 1 and the surface of depression 9, respectively. This reduces possibilities that norbornene based resin 27 leaks from cavity 25 into a gap between depression 9 and the top surface of lead frame 13, and norbornene based resin 27 adheres to lead frame 13 around laminated body 12.

Norbornene based resin 27 can be any compound having a norbornene ring structure. In particular, a polycyclic norbornene based monomer of a tricyclic or more cyclic structure is preferably used, as it is possible to obtain a molded piece with superior heat resistance. For example, it is possible to use a polymerized liquid mixture that contains dicyclopentadiene as a main component, and to which polycyclic norbornene based monomers such as tricyclopentadiene and tetracyclopentadiene or a comonomer of monocyclic cycloolefin such as cyclobutene and cyclopentene that allow ring-opening copolymerization with a norbornene based monomer is suitably added, without impairing the present invention. Specifically, it is possible to use, but not limited to, two-pack dicyclopentadiene (DCP) that is available under a trade name "PENTAM" or "METTON" from RIMTEC Corporation.

Further, according to this embodiment, norbornene based resin 27 contains an inorganic filler of aluminum hydroxide by an amount of 65% by weight or greater and 95% by weight or smaller. The inorganic filler is preferably highly flame resistant, and aluminum hydroxide, magnesium hydroxide, silica, or a mixture of these can be used. Setting the contained amount of the inorganic filler to be 65% by weight or greater improves the flame resistance, as well as flexural modulus and flexural strength after the curing, suppresses deformation of an electronic component, and increases mechanical strength.

Further, by setting the contained amount of the inorganic filler to be 95% by weight or smaller, it is possible to maintain fluidity suitable for molding.

Then, the process proceeds to the fourth step immediately after the third step. In the fourth step, as shown in FIG. 8, upper mold 3 is attached to middle mold 2, and an exposed portion of norbornene based resin 27 exposed from open top surface 26 of cavity 25 is pressed by upper mold 3 from above. As described above, upper mold 3 is a second mold that is combined with the first mold having the cavity with an open top surface on top, and, in the fourth step, upper mold 3 is arranged such that laminated body 12 as the element and norbornene based resin 27 as the resin precursor are sandwiched. Then, laminated body 12 and norbornene based resin 27 are pressed between the first mold formed of lower mold 1 and middle mold 2 and upper mold 3 as the second mold.

Meanwhile, the exposed portion of norbornene based resin 27 is a portion shown in FIG. 7 that can be seen through open top surface 26. By pressing the exposed portion of norbornene based resin 27 by upper mold 3 from above in this manner, the injected norbornene based monomer spreads into every corner of cavity 25, and is sufficiently filled.

In this manner, in the fourth step, norbornene based resin 27 is pressed by protrusion 11 provided on the lower surface of upper mold 3. As described above, the lower surface of protrusion 11 is designed to have substantially the same shape as that of top surface opening 7 of middle mold 2, that is, open top surface 26 of cavity 25. Accordingly, when pressing norbornene based resin 27 by protrusion 11, a substantial entire portion of the exposed portion of norbornene based resin 27 is pressed. By the pressing, norbornene based resin 27 is molded into a shape having height of a desired product design.

Further, by a similar method to lower mold 1 in the first step and middle mold 2 in the second step, upper mold 3 is heated in advance in the fourth step. At this time, temperature T3 of the upper mold is set in a range from 80° C. to 120° C. As described above, by producing differences in the temperatures of lower mold 1, middle mold 2, and upper mold 3, in particular, by setting the temperature of upper mold 3 highest, when lower mold 1, middle mold 2, and upper mold 3 are combined, the heat from upper mold 3 is transmitted through norbornene based resin 27 from top to bottom. With this heat, norbornene based resin 27 is cured. As described above, the temperature of upper mold 3 as the second mold is set higher than the temperatures of lower mold 1 and middle mold 2 as the first mold.

Meanwhile, in this embodiment, the exposed portion of norbornene based resin 27 is pressed by protrusion 11 provided for the lower surface of upper mold 3; however the present invention is not limited thereto. It is possible to provide a substantial quadrangular prismatic upper mold whose lower surface has a shape that is substantially the same as that of open top surface 26 of cavity 25, and the exposed portion of norbornene based resin 27 can be pressed by an entire lower surface of the upper mold.

Further, when attaching upper mold 3 in the fourth step, the lower surface of upper mold 3 and the top surface of middle mold 2 are not brought into contact with each other. Specifically, upper mold 3 stops moving down at a predetermined position indicated by broken line A-A in FIG. 8, and a minimal gap as indicated by arrow B in FIG. 8 is provided between the top surface of middle mold 2 and the lower surface of upper mold 3. This position is determined according to the height of the desired product design.

The process proceeds to the fifth step after maintaining this state for about 10 seconds. In the fifth step, as shown in FIG.

9, lower mold 1 is removed from middle mold 2. At this time, norbornene based resin 27 injected into cavity 25 is sufficiently cured by the heat from upper mold 3, and laminated body 12 is covered with norbornene based resin 27.

In the sixth step, as shown in FIG. 10, upper mold 3 is moved further downward from the above position (indicated by broken line A-A in FIG. 8), and the lower surface of upper mold 3 is brought into contact with the top surface of middle mold 2. As a result, laminated body 12 is extruded from middle mold 2, and laminated body 12 that is covered with norbornene based resin 27 and connected with lead frame 13 as shown in FIG. 11 is taken out. Cured norbornene based resin 27 corresponds to exterior packaging body 28 of laminated body 12.

Meanwhile, in top surface opening 7 and lower surface opening 8 of middle mold 2 shown in FIG. 2A and FIG. 2B, it is preferable that top surface opening 7 be slightly smaller than lower surface opening 8, such that a cross-sectional shape of hollow portion 6 is tapered, spreading out wide toward the bottom. In this manner, when extruding laminated body 12 from middle mold 2, side surfaces of exterior packaging body 28 covering laminated body 12 can be easily removed from side surfaces of hollow portion 6 of middle mold 2, facilitating taking out of laminated body 12 from middle mold 2.

Figure 12A:
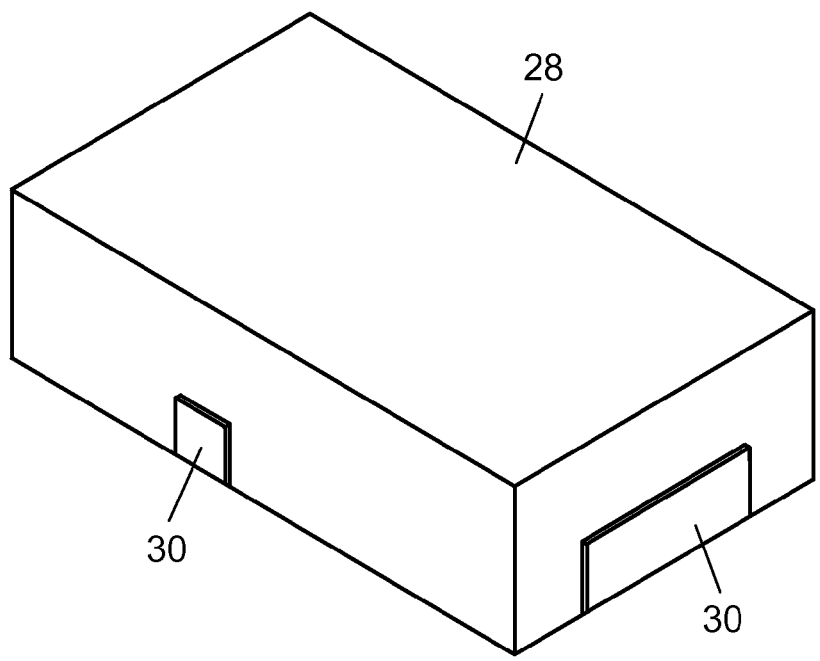
FIG. 12A is a perspective view showing a resin molded capacitor manufactured by the method of manufacturing a resin molded capacitor according to Embodiment 1 of the present invention.
Figure 12B:
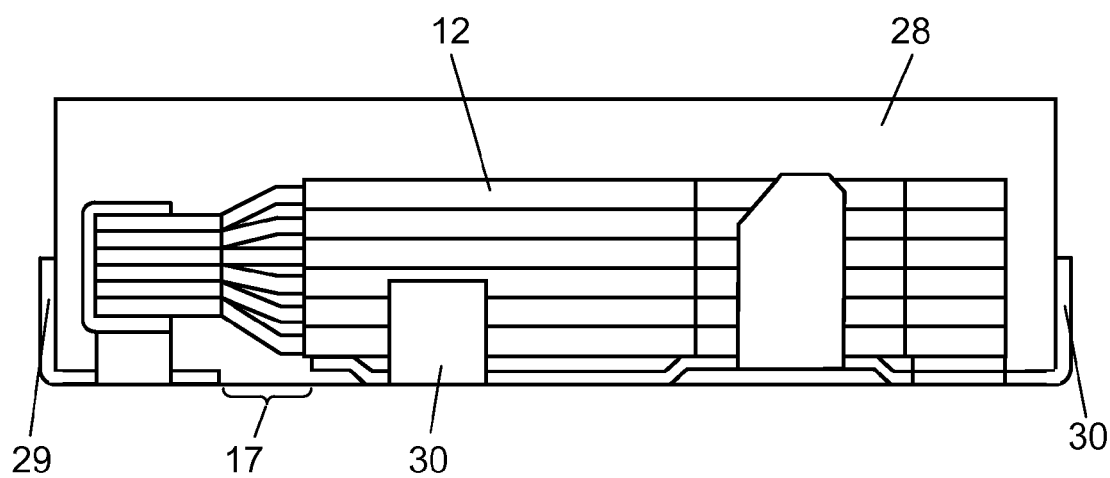
FIG. 12B is a transparent side view showing the resin molded capacitor shown in FIG. 12A.

As described above, by going through the first step through the sixth step, it is possible to form laminated body 12 that is covered with exterior packaging body 28 and connected with lead frame 13. Furthermore, lead frame 13 is cut appropriately at predetermined positions indicated by broken lines C-C in FIG. 11, and bent to exterior packaging body 28 at these positions, thereby finishing a norbornene based resin molded capacitor. The resin molded capacitor thus finished is shown in FIG. 12A and FIG. 12B. FIG. 12A is a perspective view showing an external appearance of the resin molded capacitor, and FIG. 12B is a transparent side view of the resin molded capacitor, showing an interior structure through exterior packaging body 28 as a molding resin.

The resin molded capacitor manufactured according to the manufacturing method of this embodiment is in a shape corresponding to that of cavity 25, that is, substantially cuboid or quadratic prismatic. The bent portions of lead frame 13 form positive terminal 29 and negative terminals 30 of the resin molded capacitor. Positive terminal 29 and negative terminals 30 are provided on side surfaces and a lower surface of the resin molded capacitor. As shown in FIG. 12B, lead frame 13 is previously provided with separating section 17 described above, and therefore positive terminal 29 is separated from negative terminals 30 and any short circuit between these terminals may not occur.

The following describes effects of the manufacturing method according to this embodiment. First, according to the manufacturing method of this embodiment, it is possible to manufacture a resin molded capacitor that is sufficiently covered with the exterior packaging body, and to improve reliability of the resin molded capacitor.

This is realized because temperature T1 of lower mold 1 and temperature T2 of middle mold 2 are set to be lower than temperature T3 of upper mold 3 in the fourth step. Specifically, setting the temperature of lower molds to be lower than that of an upper mold when curing norbornene based resin 27, it is possible to prevent norbornene based resin 27 from being cured before the resin sufficiently spreads to positions at which laminated body 12 is intended to be covered. Then, norbornene based resin 27 is heated and cured by the heat transmission from upper mold 3 to norbornene based resin 27. In other words, according to the manufacturing method of this embodiment, it is possible to sufficiently fill cavity 25 in FIG. 6 by norbornene based resin 27, and to sufficiently cover laminated body 12.

In order to cover laminated body 12 more efficiently, it is essential to optimally select viscosity of uncured norbornene based resin 27. The viscosity of norbornene based resin 27 can be adjusted by adding elastomers. Examples of elastomers that can be used include natural rubber, styrene-butadiene copolymer (SBR), styrene-butadiene-styrene block copolymer (SBS), styrene-isoprene-styrene copolymer (SIS), and ethylene-propylene-diene terpolymer (EPDM). Depending on an additive amount of elastomers, it is possible to adjust the viscosity within a range from about $5 \times 10^{-3}$ Pa·s to about 2 Pa·s at 30° C. In this case, the range is from $2 \times 10^{-1}$ Pa·s to 10 Pa·s at temperatures of 40° C. or higher and 60° C. or lower. The viscosity here is represented by a value measured by a rheometer.

Further, while the curing speed of norbornene based resin 27 is basically fast, this curing speed can be adjusted to some extent by adding an activity regulator. As an activity regulator, a compound capable of reducing metathesis catalyst can be used, and preferred examples include alcohols, haloalcohols, and acetylenes. Further, depending on the type of the metathesis catalyst, a Lewis base compound can be used as the activity regulator. In this embodiment, isopropyl alcohol is used as the activity regulator.

Further, as the curing speed of norbornene based resin 27 is, in general, faster than that of a thermosetting resin such as an epoxy resin, it is possible to obtain superior productivity. Moreover, the norbornene based resin also exhibits superior moisture resistance and rigidity, in general, as compared to a thermosetting resin such as an epoxy resin. Therefore, the resin molded capacitor manufactured according to the manufacturing method of this embodiment obtains excellent moisture resistance, strength, and impact resistance, providing high reliability.

Meanwhile, when the resin is injected into the mold set and the heat is transmitted from top to bottom as in the manufacturing method of this embodiment, the injected resin is cured sequentially from top to bottom. In this case, a residual stress (stress difference) tends to occur in the resin while being cured. For example, when the resin molded capacitor is manufactured according to the manufacturing method of this embodiment using a thermosetting resin such as an epoxy resin instead of the norbornene based resin, there is a possibility that the resin molded capacitor as a finished product includes warpage or a crack due to the residual stress. On the other hand, when using norbornene based resin 27 having relatively low viscosity and faster curing speed, the resin molded capacitor as a finished product is less susceptible to the residual stress, and a problem in reliability of the finished resin molded capacitor is less likely to occur.

It is preferable that temperature T1 of lower mold 1 in the third step be set to be from 40° C. to 60° C. in which the norbornene based resin 27 is injected. In general, the norbornene based resin is cured even at room temperature. However, it is confirmed that, setting the temperature of the lower mold in the third step to be 60° C. or lower as in this embodiment causes injected norbornene based resin 27 to spread within entire cavity 25 before being cured. On the other hand, considering the productivity, if the temperature of lower mold 1 is too low, time required for molding increases. Accordingly, it is preferable that a lower limit of the temperature of lower mold 1 be 40° C. Therefore, it is preferable that temperature T1 of lower mold 1 be set to be 40° C. or greater and 60° C. or lower in the third step.

Moreover, it is desirable that temperature T2 of middle mold 2 be set to be from 60° C. to 80° C. in the third step. By setting T2 to be 60° C. or greater and 80° C. or lower, it is not likely that norbornene based resin 27 is cured before spreading within cavity 25. Furthermore, it is possible to improve the productivity by heating middle mold 2 in advance to some extent.

Furthermore, it is desirable that temperature T3 of upper mold 3 be set to be from 80° C. to 120° C. in the fourth step. By setting T3 to be 80° C. or greater and 120° C. or lower, it is possible to cause norbornene based resin 27 to be sufficiently cured.

In the first step, laminated body 12 is positioned on lower mold 1 by inserting guiding pins 5 of lower mold 1 into through holes 16 of lead frame 13. In this manner, it is possible to accurately position laminated body 12 on lower mold 1 by using guiding pins 5. Guiding pins 5 according to this embodiment are but not limited to cylindrical. It is possible to obtain the same effect by employing, for example, a prismatic shape.

Moreover, it is desirable that guiding pins 5 be fitted into guiding holes 10 provided on the lower surface of middle mold 2 in the second step, in a state in which guiding pins 5 are projected from through holes 16 of lead frame 13 in the first step. With this operation, it is possible to accurately attach lower mold 1 and middle mold 2. Consequently, laminated body 12 can be disposed in hollow portion 6 of middle mold 2 at high accuracy. As described above, according to this embodiment, it is possible to position laminated body 12 on lower mold 1, and then to place laminated body 12 in hollow portion 6 of middle mold 2 in an accurate manner using guiding pins 5.

Further, according to this embodiment, in the fourth step, a substantial entire surface of the exposed portion of norbornene based resin 27 exposed from open top surface 26 of cavity 25 is pressed by protrusion 11 provided on the lower surface of upper mold 3. With this operation, the heat from upper mold 3 is transmitted to norbornene based resin 27, and norbornene based resin 27 is cured. By pressing the exposed portion of norbornene based resin 27 using protrusion 11, it is possible to use a portion of the lower surface of upper mold 3 excluding protrusion 11 as a stopper when extruding laminated body 12 covered with norbornene based resin 27 in the sixth step. Specifically, it is possible to prevent laminated body 12 from being extruded downwardly beyond necessity by bringing the lower surface of upper mold 3 and the top surface of middle mold 2 into contact with each other and serving as the stopper when laminated body 12 is extruded. Consequently, it is possible to prevent breakage from occurring in laminated body 12, exterior packaging body 28, and lead frame 13, thereby improving productivity.

Figure 13:
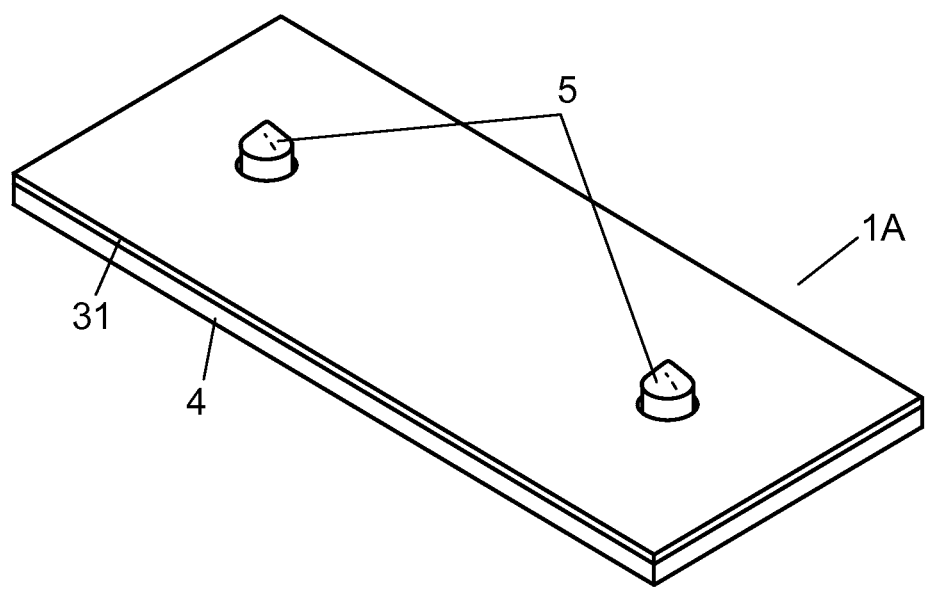
FIG. 13 is a perspective view showing another lower mold used in the method of manufacturing a resin molded capacitor according to Embodiment 1 of the present invention.

Further, as shown in FIG. 13, it is possible to use lower mold 1A configured such that an upper portion of base plate 4 is covered with a sheet-shaped elastic material. FIG. 13 is a perspective view showing another lower mold used in the method of manufacturing a resin molded capacitor according to this embodiment. Specifically, elastic surface 31 may be provided on a contact surface with middle mold 2. According to this structure, when attaching middle mold 2 to lower mold 1A, elastic surface 31 deforms according to the shape of the lower surface of middle mold 2 and it is possible to improve adhesiveness between lower mold 1A and middle mold 2. As a result, it becomes less likely that norbornene based resin 27 overflows through a gap between lower mold 1A and middle mold 2 when injecting norbornene based resin 27 into cavity 25 in the third step. Here, a rubber material such as silicon and urethane can be used as a material that forms elastic surface 31. The properties of these rubber materials do not change within a range of a temperature of lower mold 1A according to the manufacturing method of this embodiment, and therefore any problems are not likely to occur in the manufacturing process and qualities of a resin molded capacitor as a finished product.

With the similar reasons, an entirety of lower mold 1 can be configured by an elastic material. Similarly, in this case, it is possible to improve adhesiveness between lower mold 1 and middle mold 2, and therefore it becomes less likely that norbornene based resin 27 leaks through the gap between lower mold 1 and middle mold 2.

Further, an entirety of middle mold 2 may be configured by an elastic material. According to this structure, when attaching middle mold 2 to lower mold 1, it is possible to improve adhesiveness between lower mold 1 and middle mold 2, and it becomes less likely that norbornene based resin 27 overflows through a gap between lower mold 1 and middle mold 2. Moreover, when attaching middle mold 2 to upper mold 3, it is possible to improve adhesiveness between middle mold 2 and upper mold 3, and it becomes less likely that norbornene based resin 27 leaks through a gap between middle mold 2 and upper mold 3.

Figure 14:
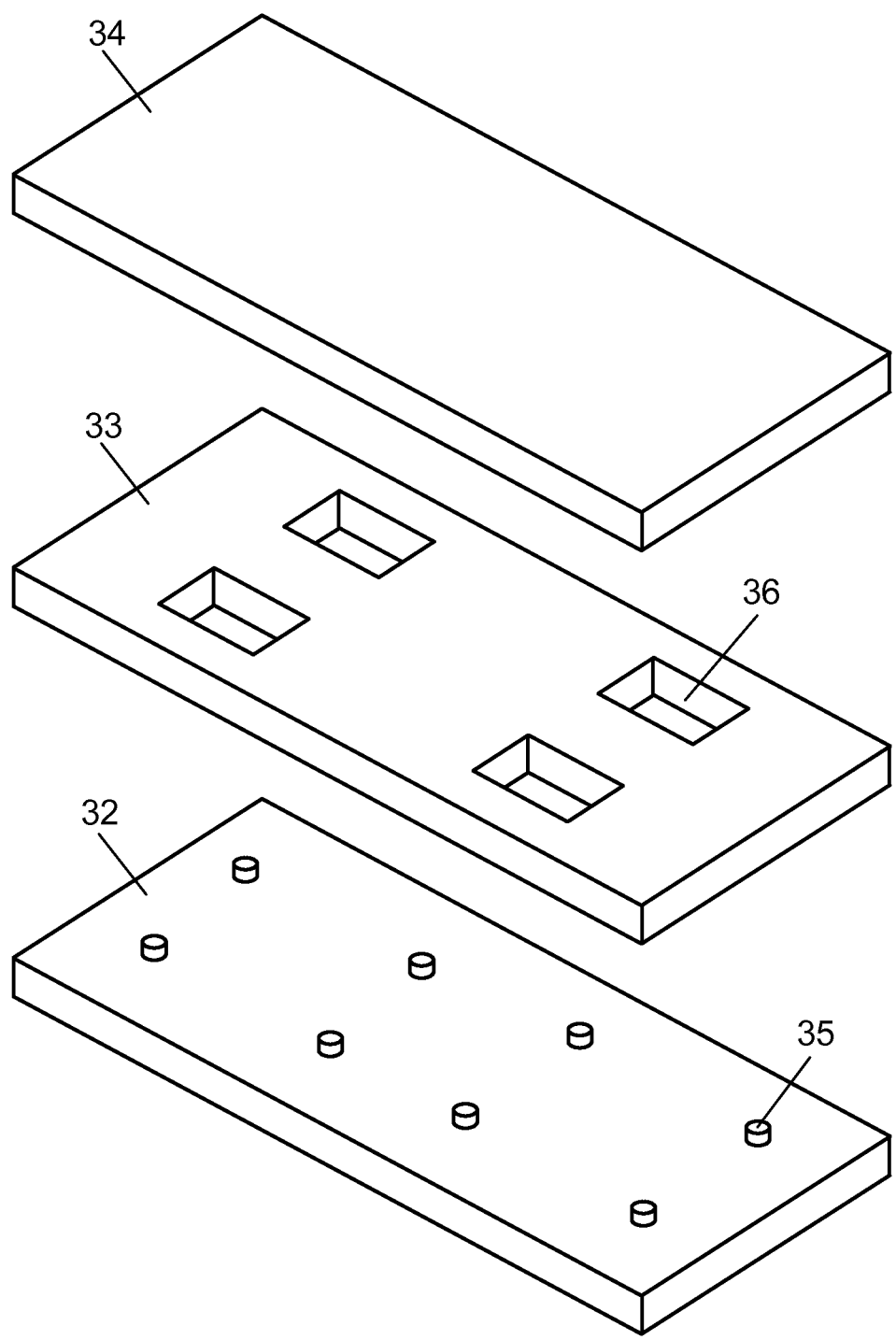
FIG. 14 is a perspective view showing another mold set used in the method of manufacturing a resin molded capacitor according to Embodiment 1 of the present invention.

Moreover, as shown in FIG. 14, the manufacturing method of this embodiment can be applied to a mold set with which a plurality of resin molded capacitors are formed at the same time. FIG. 14 is a perspective view showing another mold set used in the method of manufacturing a resin molded capacitor according to this embodiment. In order to form four resin molded capacitors at the same time, lower mold 32, middle mold 33, and upper mold 34 are configured in the following manner: lower mold 32 is provided with eight guiding pins 35, middle mold 33 is provided with four hollow portions 36, and upper mold 34 is provided with four protrusions (not shown).

By applying the above manufacturing method using the mold set thus configured, it is possible to form four resin molded capacitors at the same time. Further, the resin molded capacitor manufactured using this mold set is, similarly to the resin molded capacitor described above, sufficiently covered with the exterior packaging body and provides high reliability.

Although FIG. 14 shows the mold set with which four resin molded capacitors are formed at the same time, the present invention is not limited thereto, and it is possible to apply the manufacturing method of this embodiment to a mold set with which resin molded capacitors of the number other than four are manufactured.

(Embodiment 2)

Figure 15:
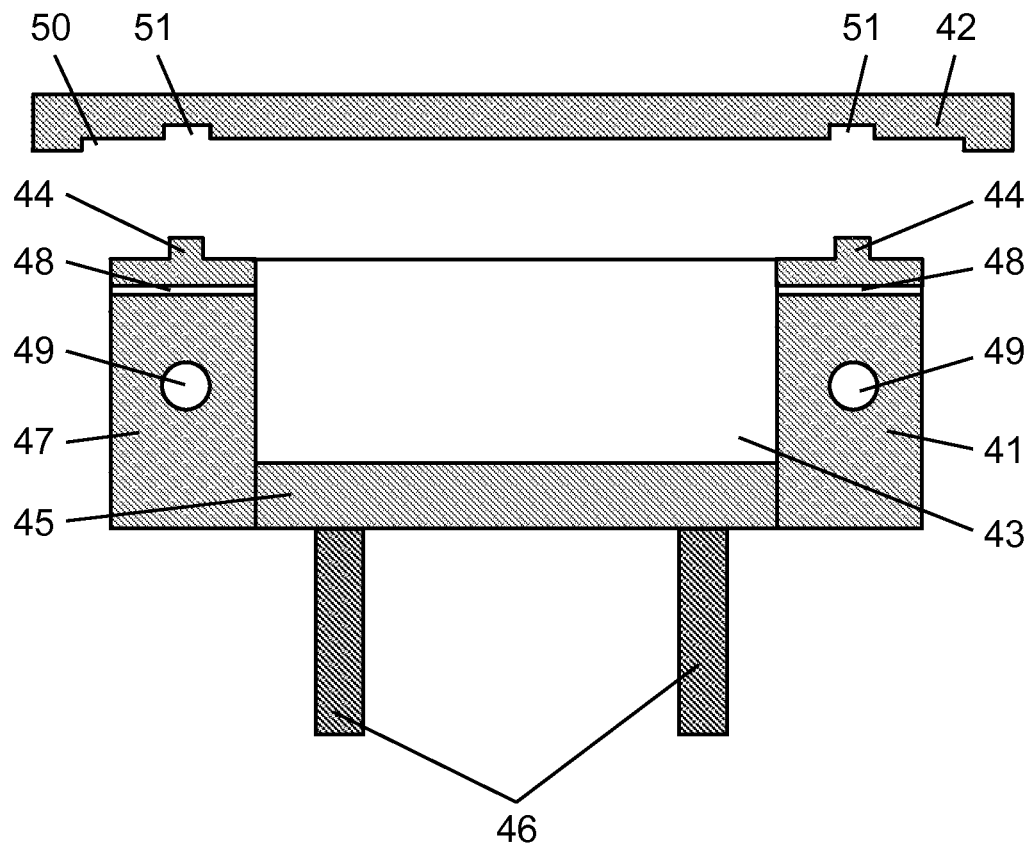
FIG. 15 is a cross-sectional view showing an upper mold and a lower mold used in a method of manufacturing a resin molded electronic component according to Embodiment 2 of the present invention.

Next, similarly to Embodiment 1, a method of manufacturing a resin molded capacitor is described as a method of manufacturing a resin molded electronic component according to Embodiment 2 of the present invention. First, a structure of a mold set used in this manufacturing method is described with reference to FIG. 15. FIG. 15 is a cross-sectional view showing a lower mold and an upper mold.

The mold set used in the method of manufacturing a resin molded capacitor in this embodiment includes lower mold 41 and upper mold 42. Lower mold 41 is a first mold including cavity 43 with its top surface open, and upper mold 42 is a second mold that is combined with lower mold 41 on top. By combining these two molds arranged one above the other, injecting a norbornene based resin into cavity 43 of lower mold 41, and then attaching upper mold 42 to lower mold 41, an exterior packaging body of a capacitor element laminated body as a element is molded. Here, an up-down relation between components shown in FIG. 15 corresponds to an actual up-down relation when the manufacturing method is put into practice. Further, the capacitor element laminated body and the lead frame that are embedded in the norbornene based resin have the same structures as laminated body 12 and lead frame 13 described in Embodiment 1 with reference to FIG. 4A to FIG. 4C.

A shape of lower mold 41 is C-shaped in its cross-section, and configured with side wall 47 and bottom 45. In a central portion of lower mold 41, quadrangular prismatic cavity 43 with the open top surface is provided. Specifically, cavity 43 is a space defined by side wall 47. Two cylindrical guiding pins 44 are provided upright on a top end portion of side wall 47, that is, on a surface of a circumferential edge portion of the opening, integrally with side wall 47. Outer circumferential edges of top end surfaces of guiding pin 44 are chamfered, and this facilitates insertion into guiding holes 51 of upper mold 42 that will be later described or through holes 16 of lead frame 13 shown in FIG. 4A. Alternatively, forming a top end of each guiding pin 44 semispherical also facilitates the insertion into guiding holes 51 of upper mold 42 and through holes 16 of lead frame 13.

Bottom 45 is planar, and piston 46 is provided under bottom 45. Bottom 45 is slidable by piston 46 in an up-down (vertical) direction with respect to side wall 47. Therefore, it is possible to change a content volume of cavity 43 by moving bottom 45 upward and downward.

Further, side wall 47 is provided with through holes 48 penetrating through side wall 47 from cavity 43 to an exterior of lower mold 41. The diameter of through holes 48 is approximately 0.2 mm, which is considerably smaller than the depth of cavity 43.

Moreover, side wall 47 is provided with cooling mechanism 49. Specifically, a pipe arrangement is embedded within side wall 47 so as to enclose cavity 43. Cooling mechanism 49 cools lower mold 41 by water-cooling by flowing temperature-controlled water through the pipe arrangement. However, the cooling method is not limited to water-cooling, and it is possible to use air-cooling or oil-cooling.

Upper mold 42 has a planar shape. A lower surface of upper mold 42 is provided with slight depression 50. Depression 50 is provided in order to accommodate lead frame 13 therein, as will be later described. Specifically, the depth of depression 50 is substantially the same as the thickness of lead frame 13, and the shape of depression 50 is rectangular which is substantially the same as that of an outer circumference portion of lead frame 13. Further, two guiding holes 51 in which guiding pins 44 are fitted are provided in depression 50. Meanwhile, upper mold 42 is planar, but not particularly limited thereto. Further, a material of lower mold 41 and upper mold 42 are the same as that of lower mold 1, middle mold 2, and upper mold 3 according to Embodiment 1.

Next, the method of manufacturing a resin molded capacitor according to this embodiment is described with reference to FIG. 16 to FIG. 20.

Figure 16:
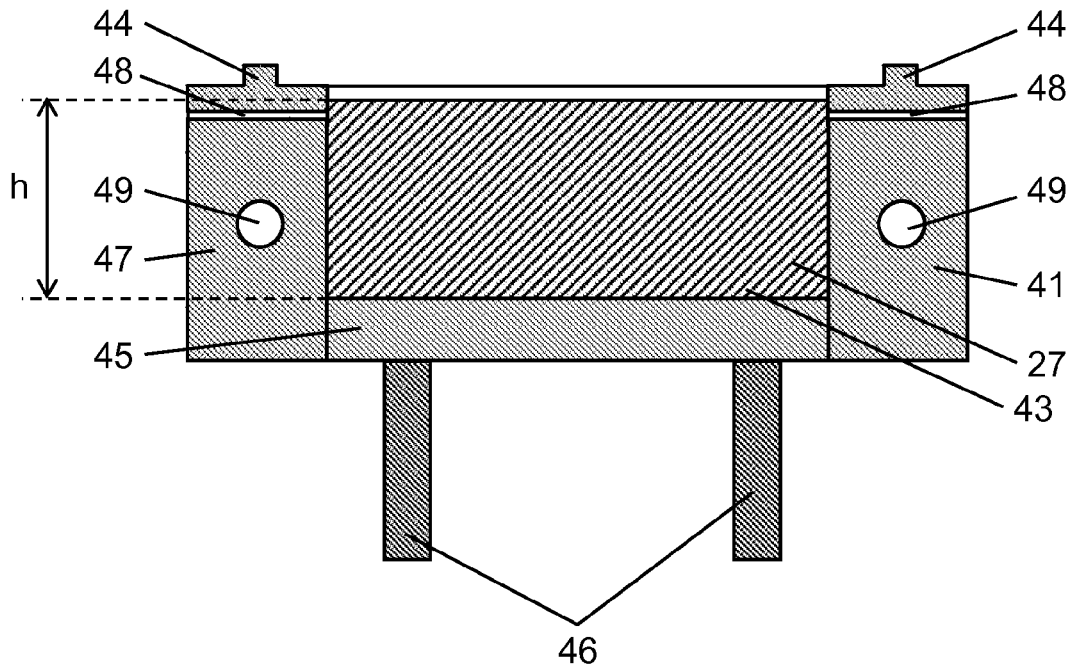
FIG. 16 is a cross-sectional view showing a first step in the method of manufacturing a resin molded electronic component according to Embodiment 2 of the present invention.
Figure 17:
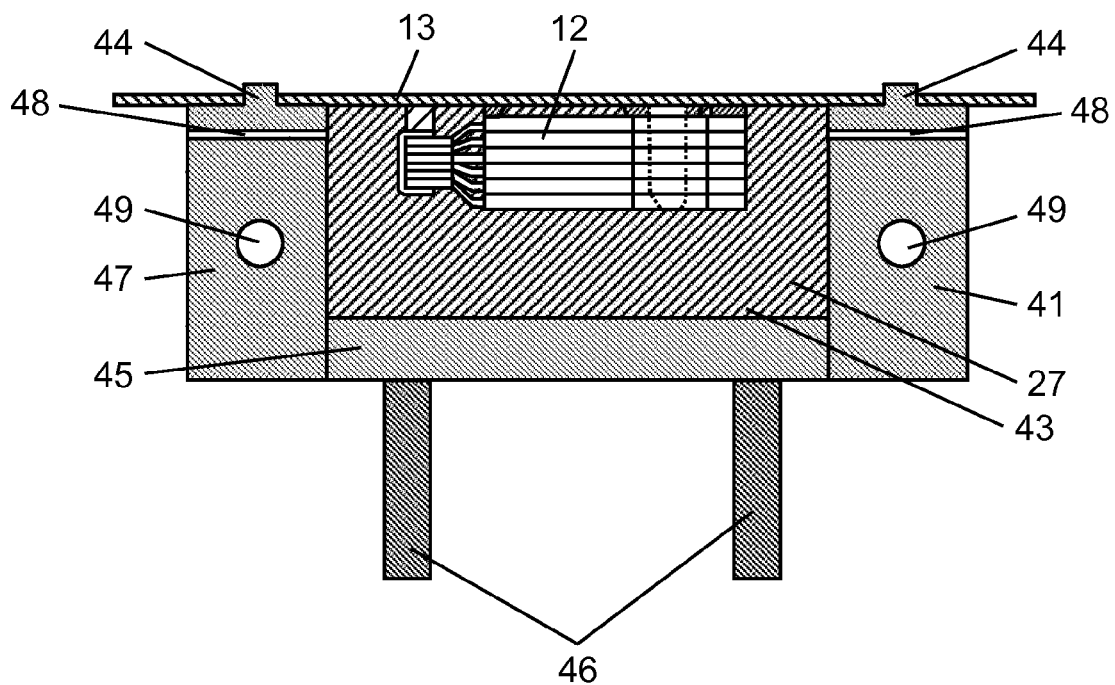
FIG. 17 is a cross-sectional view showing a second step following the first step shown in FIG. 16.
Figure 18:
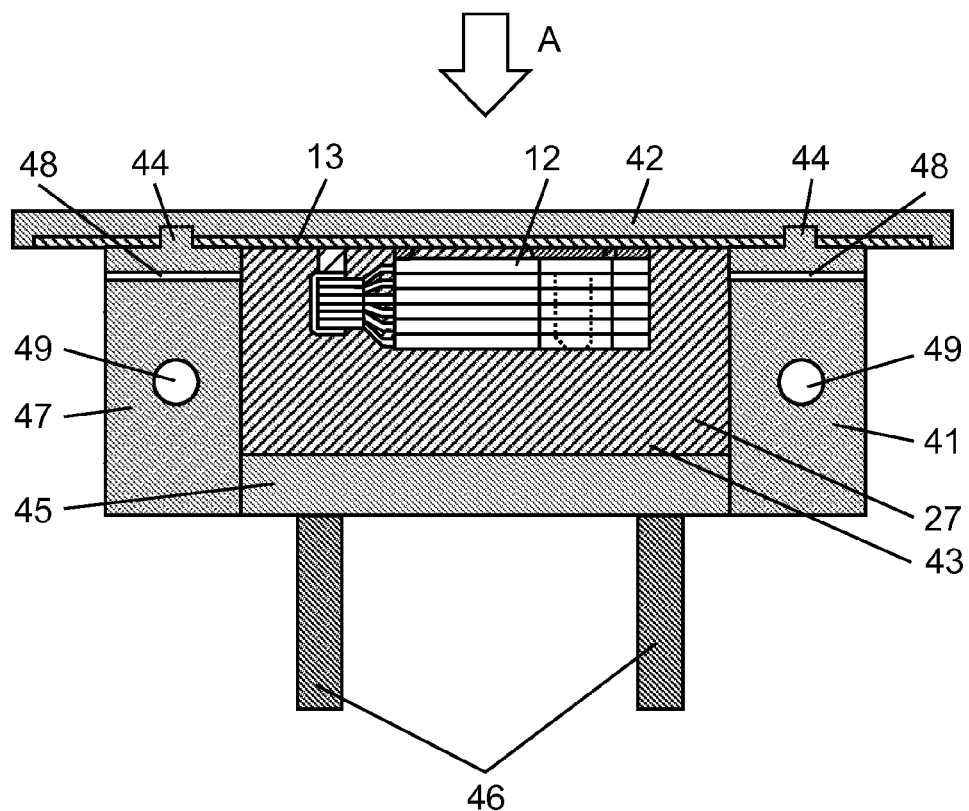
FIG. 18 is a cross-sectional view showing a third step following the second step shown in FIG. 17.
Figure 19:
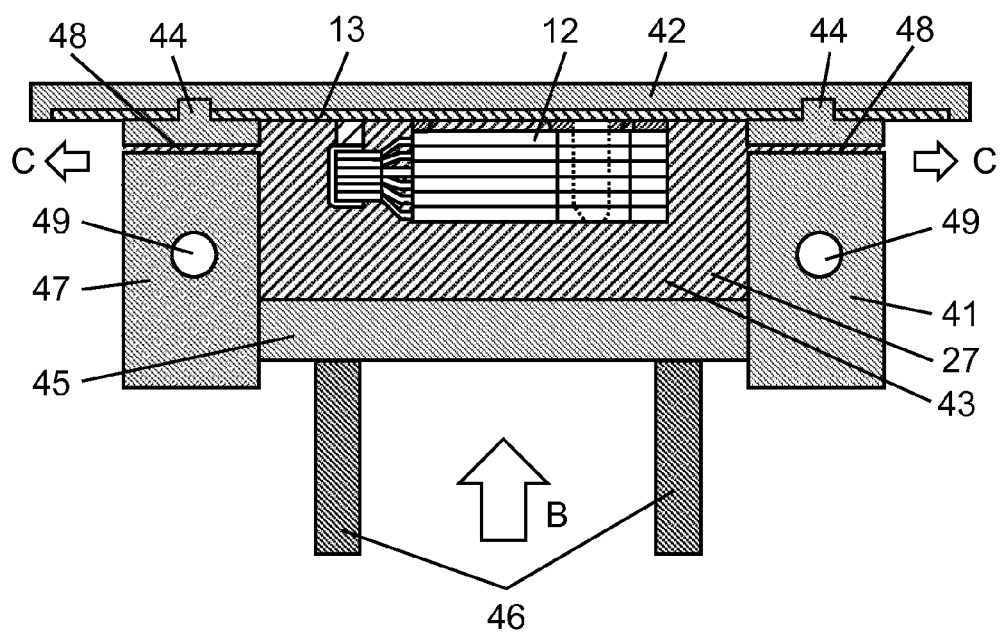
FIG. 19 is a cross-sectional view showing a state of the third step after FIG. 18.
Figure 20:
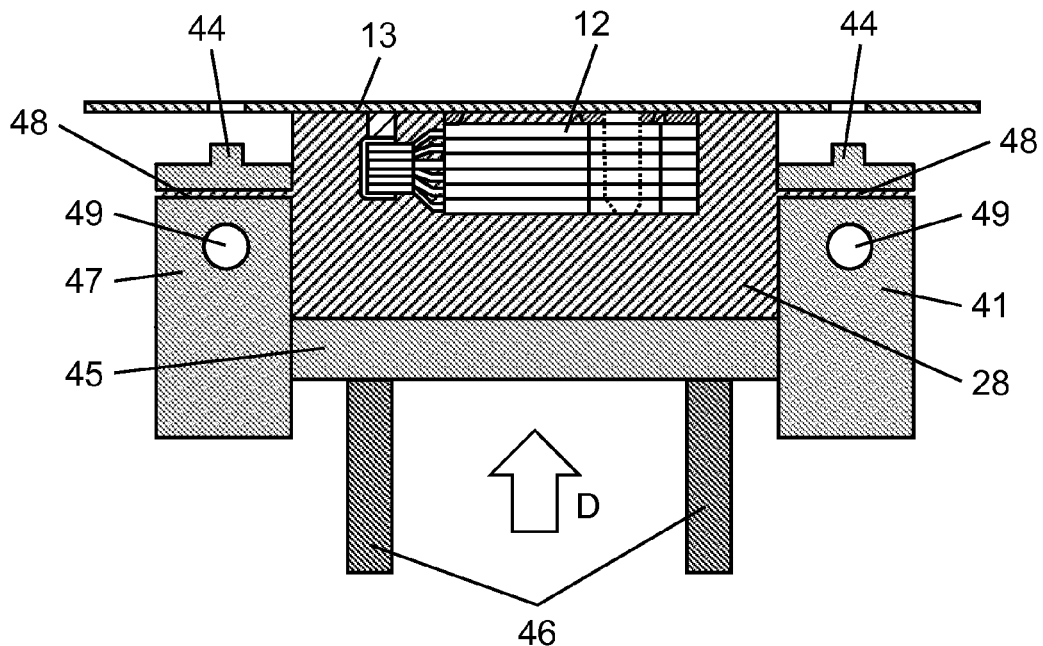
FIG. 20 is a cross-sectional view showing a fourth step following the third step shown in FIG. 18 and FIG. 19.

FIG. 16 is a cross-sectional view showing a first step in which uncured norbornene based resin 27 as a liquid resin precursor containing a norbornene monomer is injected into cavity 43 of lower mold 41. FIG. 17 is a cross-sectional view showing a second step in which a combined body of capacitor element laminated body (hereinafter referred to as laminated body) 12 and lead frame 13 is placed on lower mold 41 and laminated body 12 is embedded in norbornene based resin 27. FIG. 18 and FIG. 19 are cross-sectional views showing a third step in which norbornene based resin 27 is molded and cured over laminated body 12 and exterior packaging body 28 covering laminated body 12 is formed. FIG. 20 is a cross-sectional view showing a fourth step in which laminated body 12 over which exterior packaging body 28 has been formed is taken out from the mold set.

In the first step, as shown in FIG. 16, a specific amount of liquid norbornene based resin 27 is injected into an opening in a top surface of cavity 43 using such as a nozzle. The injection of norbornene based resin 27 is finished at predetermined height "h" slightly lower than the top end of cavity 43 so as to prevent overflowing from cavity 43. Here, height "h" in FIG. 16 represents a height from an inner bottom surface of cavity 43.

As described above, side wall 47 of lower mold 41 is provided with through holes 48. As the diameter of through holes 48 are small and liquid norbornene based resin 27 is viscous albeit only slightly, at the point of the first step, it is not likely that norbornene based resin 27 overflows outside by way of through holes 48.

Further, in the first step, the temperature of lower mold 41 is set to be 40° C. or higher and 60° C. or lower. As an example of a heating method, the method similar to that used for lower mold 1 according to Embodiment 1 can be employed. While lower mold 41 is heated in this manner in the first step, norbornene based resin 27 is not cured very quickly at the temperature of 40° C. or higher and 60° C. or lower. Specifically, this range of the temperatures is so-called below curing temperature. Accordingly, curing of norbornene based resin 27 does not finished in the first step. Therefore, norbornene based resin 27 spreads into every corner of cavity 43. However, it is desirable that the process moves to a subsequent step as soon as possible, as leaving a state of the first step for an extended period of time eventually reduces fluidity of norbornene based resin 27, and it becomes difficult to carry out operations after this step. As used herein, the curing temperature is defined as a temperature at which molding time required for obtaining a bulk molded piece of 7.0×4.0×2.0 mm (the size equals to that of the resin molded capacitor according to this embodiment) is 30 seconds or shorter when using norbornene based resin 27 in a mold at this temperature.

In the second step, as shown in FIG. 17, the combined body of laminated body 12 and lead frame 13 attached to laminated body 12 is placed on the top end surface of lower mold 41. At this time, guiding pins 44 provided on the top surface of lower mold 41 are inserted into through holes 16 of lead frame 13, and thus the placement is done. By this operation, lead frame 13 and laminated body 12 are accurately fixed and positioned at predetermined positions. Although more than two guiding pins 44 can be provided, it is possible to accurately position lead frame 13 and laminated body 12 on lower mold 41 by providing at least two guiding pins 44.

As shown in FIG. 17, laminated body 12 comes under lead frame 13. Then, the combined body of laminated body 12 and lead frame 13 is positioned such that laminated body 12 comes closer to the inner bottom surface of lower mold 41 and a portion of lead frame 13 is placed on the top end surface of lower mold 41. Therefore, laminated body 12 is immersed (embedded) in norbornene based resin 27 that has been injected into cavity 43 of lower mold 41 in the first step.

Immersing laminated body 12 in norbornene based resin 27 in this manner raises a fluid level of norbornene based resin 27 by a volume of laminated body 12. At this time, it is desirable that the fluid level after the rise be the same as or slightly lower than the height of the top end surface of side wall 47 of lower mold 41. Therefore, it is desirable to set injection height "h" of norbornene based resin 27 in the first step so that the fluid level of norbornene based resin 27 in the second step after the rise is in the state described above.

In the third step, first, as indicated by arrow A in FIG. 18, upper mold 42 is moved downward from above lower mold 41, and upper mold 42 is attached to lower mold 41. At this time, guiding pins 44 projecting from through holes 16 of lead frame 13 are fitted into guiding holes 51 of upper mold 42. By this operation, upper mold 42 is accurately positioned with respect to lower mold 41 and lead frame 13. Attaching upper mold 42 to lower mold 41 in this manner results in a state in which lead frame 13 is sandwiched between lower mold 41 and upper mold 42. In this case, as lead frame 13 is fitted into depression 50 of upper mold 42, the top surface of lead frame 13 is substantially in close contact with a surface of depression 50 of upper mold 42. Further, the top end portion of lower mold 41 is substantially in close contact with lead frame 13 and a lower surface portion of upper mold 42.

Upper mold 42 is heated in advance before the third step up to the curing temperature of norbornene based resin 27 or higher. Specifically, upper mold 42 is heated up to the temperature of 80° C. or higher and 120° C. or lower. Therefore, at the same time as upper mold 42 is attached to lower mold 41, the heat from upper mold 42 is transmitted to norbornene based resin 27 in cavity 43 and the curing of norbornene based resin 27 starts.

Moreover, in the third step, as indicated by arrow B in FIG. 19, bottom 45 of lower mold 41 slides upward by piston 46 to press norbornene based resin 27 up to a position at which norbornene based resin 27 in cavity 43 to have the height of the desired product design. With this operation, a pressure is applied to norbornene based resin 27 in cavity 43, and norbornene based resin 27 spreads into minute portions of cavity 43, thereby filling cavity 43 with norbornene based resin 27. This operation is particularly important, as it is difficult to spread norbornene based resin 27 into minute portions of a molded piece that is small and whose range to be filled by norbornene based resin 27 has a complex shape as in the case of laminated body 12.

When bottom 45 of lower mold 41 is pressed toward the upper mold, air and excessive norbornene based resin 27 within cavity 43 are discharged outside lower mold 41 by way of through holes 48 as indicated by arrow C. Through holes 48 in this embodiment are provided in side wall 47 of lower mold 41; however the position is not limited thereto, and the same effect can be obtained even if through holes 48 are provided in upper mold 42. Alternatively, it is possible to provide the through holes in both lower mold 41 and upper mold 42.

It is desirable that, in the third step, bottom 45 be moved toward upper mold 42 as soon as upper mold 42 is attached to lower mold 41. The curing of norbornene based resin 27 starts immediately after high temperature upper mold 42 is attached to lower mold 41. Accordingly, if time elapses from the attachment before the third step, norbornene based resin 27 is cured and its fluidity is reduced. As a result, there is a possibility that norbornene based resin 27 does not spread into minute portions of cavity 43 and a resin molded capacitor of a desired shape cannot be obtained. Ideally, the upward movement of bottom 45 of lower mold 41 starts at the same time as upper mold 42 is attached to lower mold 41 in the third step.

Further, as described above, the top surface of lead frame 13 is substantially in close contact with a surface of depression 50 of upper mold 42, and the top end portion of lower mold 41 is substantially in close contact with lead frame 13 and the lower surface portion of upper mold 42. This reduces possibilities that norbornene based resin 27 leaks from cavity 43 into a gap between depression 50 and the top surface of lead frame 13, and leaks outside through a gap between lead frame 13 and the top end portion of lower mold 41.

Next, the process proceeds to the fourth step after maintaining this state for about 10 seconds. Norbornene based resin 27 is sufficiently cured during this period, as norbornene based resin 27 can be cured in a short period of time.

Then, as shown in FIG. 20, in the fourth step, upper mold 42 is removed from lower mold 41, and the bottom 45 of lower mold 41 is moved further upward as indicated by arrow D, thereby extruding laminated body 12 that is covered with exterior packaging body 28 formed by curing norbornene based resin 27 outside the mold set. At this time, norbornene based resin 27 injected into cavity 43 is sufficiently cured by the temperature of upper mold 42.

As a result, laminated body 12 as shown in FIG. 11 in Embodiment 1 is taken out. Thereafter, similarly to Embodiment 1, lead frame 13 is cut appropriately at predetermined positions, and bent along exterior packaging body 28 at these positions, thereby finishing a resin molded capacitor.

As described above, according to the manufacturing method of this embodiment, it is also possible to obtain the same effect as that of the manufacturing method according to Embodiment 1.

From the first step through the third step, it is desirable to set the temperature of lower mold 41 to be 40° C. or higher and 60° C. or lower. While norbornene based resin 27 is generally cured even at room temperature over time, setting the temperature of lower mold 41 to be 60° C. in the first step causes injected norbornene based resin 27 to spread within entire cavity 43 before being cured. On the other hand, considering the productivity, as the time required for molding increases if the temperature of lower mold 41 is too low, it is desirable that a lower limit of the temperature of lower mold 41 be 40° C.

Further, it is desirable to set the temperature of upper mold 42 in advance to be 80° C. or higher and 120° C. or lower prior to the third step. By setting the temperature of upper mold 42 in this manner, it is possible to sufficiently cure norbornene based resin 27.

In the second step, guiding pins 44 of lower mold 41 are inserted into through holes 16 of lead frame 13. With this operation, the combined body of laminated body 12 and lead frame 13 is positioned on the top end portion of lower mold 41. In this manner, it is possible to accurately position the combined body of laminated body 12 and lead frame 13 by using guiding pins 44. Guiding pins 44 according to this embodiment are not limited to cylindrical. It is possible to obtain the same effect by employing, for example, a prismatic shape.

It is preferable that side wall 47 of lower mold 41 be provided with through holes 48 penetrating through side wall 47 from cavity 43 to outside. It is possible to discharge excessive air and excessive norbornene based resin 27 within cavity 43 outside by providing through holes 48 as described above. Accordingly, it is possible to fill cavity 43 shown in FIG. 19 with norbornene based resin 27 without leaving any gap. Therefore, it is possible to sufficiently cover laminated body 12 with norbornene based resin 27, and to improve reliability of the resin molded capacitor as a finished product.

It is preferable that lower mold 41 be provided with cooling mechanism 49. In the first step, the temperature of lower mold 41 is required to be controlled to be the curing temperature or lower of norbornene based resin 27 (40° C. or higher and 60° C. or lower). Therefore, when sequentially manufacturing resin molded capacitors using lower mold 41, it is necessary to cool lower mold 41 after manufacturing a resin molded capacitor from the first step through fourth step. Accordingly, by providing cooling mechanism 49 for lower mold 41 and cooling lower mold 41 after norbornene based resin 27 is cured, it is possible to manufacture a resin molded capacitor with excellent productivity.

According to this embodiment, norbornene based resin 27 is injected into cavity 43 in the first step, and then the combined body of laminated body 12 and lead frame 13 is placed on lower mold 41 in the second step. However, these steps are not limited to such an order. Specifically, first, the combined body of laminated body 12 and lead frame 13 is place on lower mold 41. Then, norbornene based resin 27 can be injected into cavity 43 of lower mold 41 up to the predetermined level, for example, through a gap between lead frame 13 and an opening end portion of lower mold 41, or through a punched portion of lead frame 13. Therefore, in this case, the first step is carried out after the second step. Even in this case, it is possible to manufacture a highly reliable resin molded capacitor similarly to that manufactured according to the method described previously. Specifically, in this embodiment, laminated body 12 and norbornene based resin 27 as a liquid resin precursor containing norbornene monomer are also inserted into cavity 43 of lower mold 41 as the first mold. Then, upper mold 42 as the second mold is placed so as to sandwich laminated body 12 and norbornene based resin 27. Thereafter, laminated body 12 and norbornene based resin 27 are pressed between lower mold 41 and upper mold 42, norbornene based resin 27 is cured by the temperature of upper mold 42. At this time, the temperature of upper mold 42 is set to be higher than that of lower mold 41.

Figure 21:
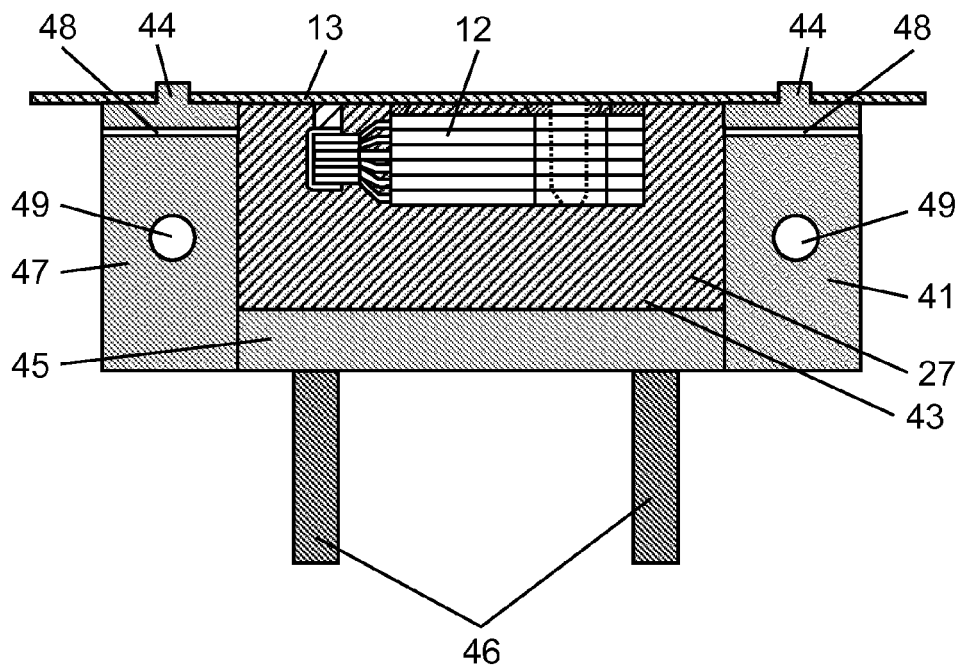
FIG. 21 is a cross-sectional view showing a state after the first and second steps in another method of manufacturing a resin molded electronic component according to Embodiment 2 of the present invention.

Next, another method of manufacturing a resin molded capacitor according to this embodiment is described with reference to FIG. 21 to FIG. 24. First, a state as shown in FIG. 21 is provided through a first step and a second step similarly to those of the manufacturing method described above.

Figure 22:
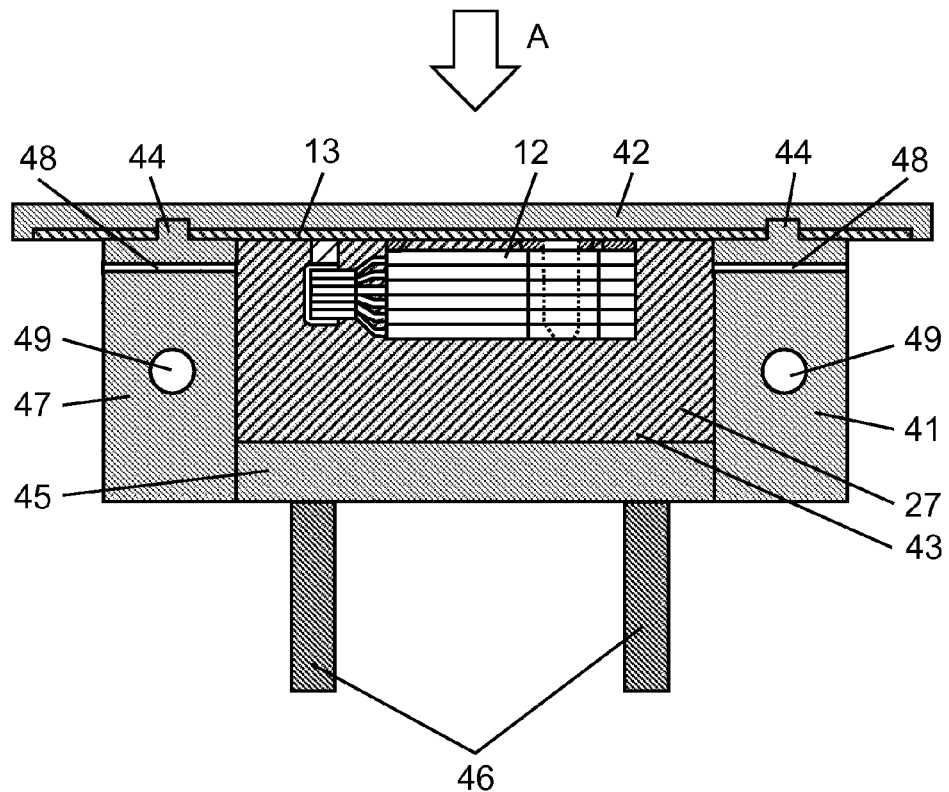
FIG. 22 is a cross-sectional view showing a third step following the second step shown in FIG. 21.

Next, as shown in FIG. 22, upper mold 42 is moved downward, and is attached to lower mold 41. At this point, in the previously described manufacturing method, upper mold 42 is heated in advance up to the curing temperature of norbornene based resin 27 or higher. However, according to this manufacturing method, upper mold 42 is not heated. Specifically, the temperature of upper mold 42 is equal to the curing temperature of norbornene based resin 27 or lower. Accordingly, rapid curing of norbornene based resin 27 does not start. This point is different from the previously described manufacturing method. Here, considering the productivity of the resin molded capacitor, it is desirable to set the temperatures of lower mold 41 and upper mold 42 at this point to be 40° C. or greater and 60° C. or lower.

Figure 23:
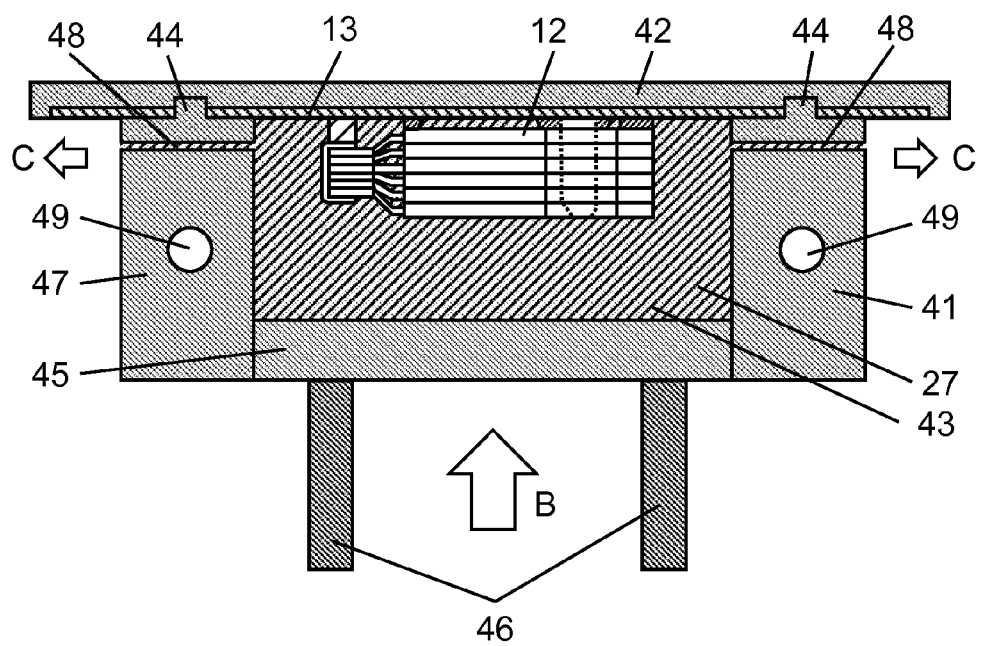
FIG. 23 is a cross-sectional view showing a state of the third step after FIG. 22.

Moreover, as indicated by arrow B in FIG. 23, bottom 45 of lower mold 41 slides upward by piston 46 to press norbornene based resin 27 within cavity 43. At this time, lower mold 41 and upper mold 42 are both at the curing temperature of norbornene based resin 27 or lower. Accordingly, norbornene based resin 27 has sufficient fluidity without being cured, and spreads all over cavity 43.

Figure 24:
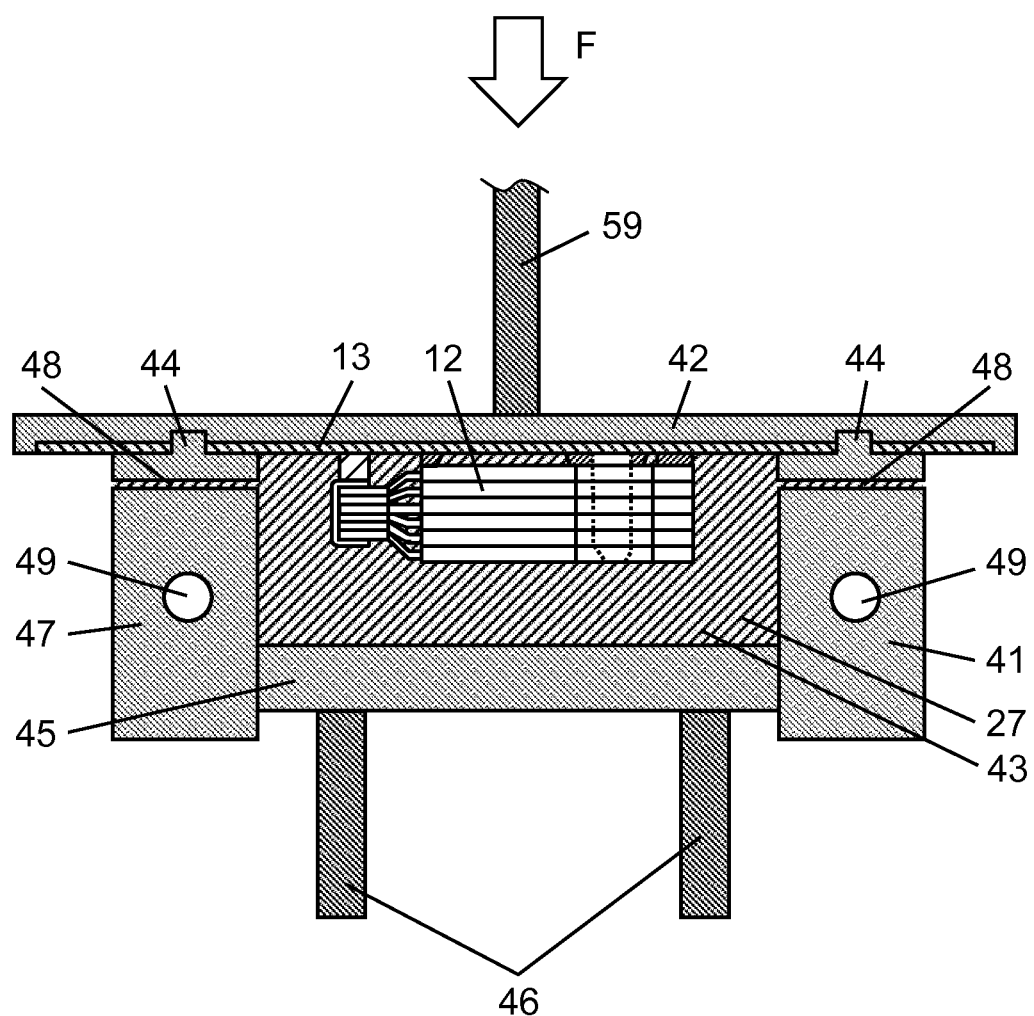
FIG. 24 is a cross-sectional view showing a state of the third step after FIG. 23.

Then, after bottom 45 of lower mold 41 is moved up to the predetermined position (the position at which the height of the desired product design can be obtained), heated pin 59 is brought into contact with upper mold 42 from above as indicated by arrow F in FIG. 24. At this time, a temperature of heated pin 59 is set to be 80° C. or higher and 120° C. or lower, which is equal to or higher than the curing temperature of norbornene based resin 27. Upper mold 42 is heated up to the curing temperature of norbornene based resin 27 or higher due to heat transmitted from heated pin 59, the heat from upper mold 42 is then transmitted to norbornene based resin 27 in cavity 43, and the curing starts.

After norbornene based resin 27 is cured, the resin molded capacitor is finished by going through the processes of and after the fourth step as previously described.

According to this manufacturing method, when sliding bottom 45 of lower mold 41 in the third step, the temperatures of lower mold 41 and upper mold 42 are equal to the curing temperature of norbornene based resin 27 or lower. Accordingly, norbornene based resin 27 has not started curing, and has sufficient fluidity. Therefore, as norbornene based resin 27 has sufficient fluidity in this manner, norbornene based resin 27 spreads all over within cavity 43. Then, after norbornene based resin 27 spreads all over within cavity 43, norbornene based resin 27 is cured. Accordingly, it is possible to further reduce an uncovered portion of exterior packaging body 28 of the resin molded capacitor as a finished product, and it is possible to manufacture a highly reliable resin molded capacitor.

In the above description, upper mold 42 is heated after the sliding of bottom 45 ends; however the operation is not limited thereto, and upper mold 42 can be heated during the sliding of bottom 45. In this case, the curing of norbornene based resin 27 progresses in parallel with the sliding of bottom 45, and it is possible to cause norbornene based resin 27 to spread within cavity 43 relatively in a short period of time due to the sliding of bottom 45. Accordingly, it is possible to fill cavity 43 before norbornene based resin 27 is fully cured.

Further, while upper mold 42 is heated up to the curing temperature of norbornene based resin 27 or higher by bringing heated pin 59 into contact with upper mold 42, the heating method is not particularly limited to this method. Instead of using heated pin 59, for example, it is possible to employ a method of heating by inserting rod-shaped cartridge heater into upper mold 42, or automatically adjusting the temperature by a heater embedded within lower mold 41.

In other words, according to this manufacturing method, lower mold 41 can be heated instead of upper mold 42. Even when lower mold 41 is heated, it is possible to transmit the heat to norbornene based resin 27, and to cure norbornene based resin 27. Alternatively, both lower mold 41 and upper mold 42 can be heated. In this case, it is possible to efficiently transmit the heat to norbornene based resin 27, and to improve the productivity of resin molded capacitors.

(Embodiment 3)

Figure 25:
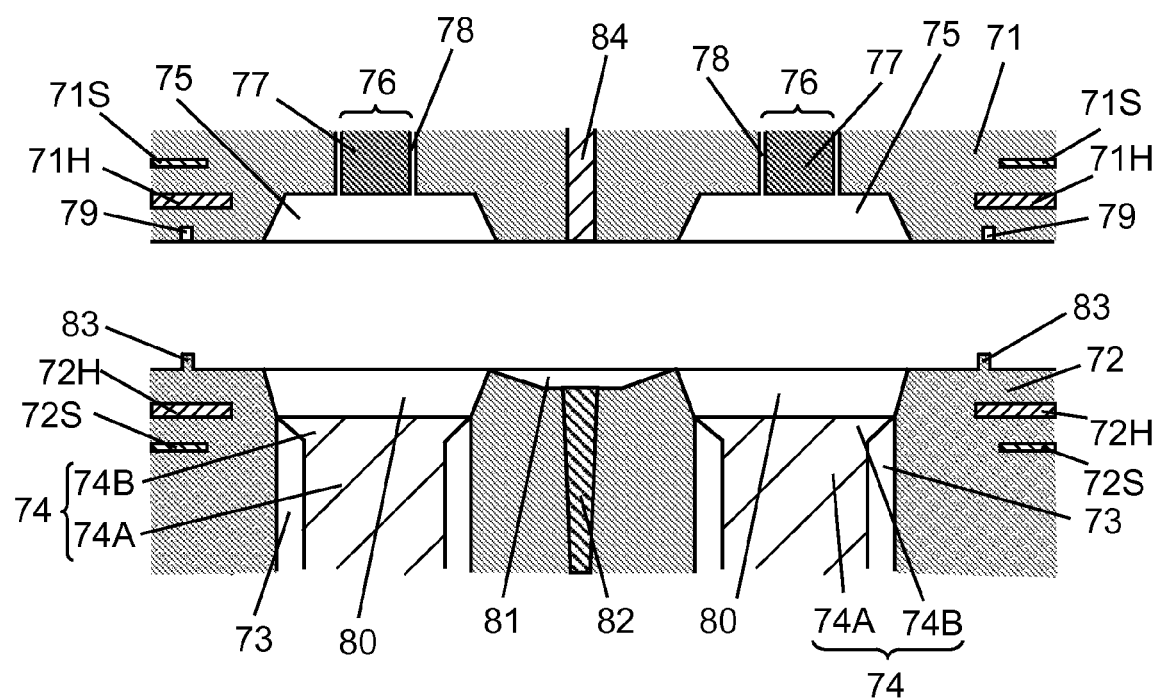
FIG. 25 is a cross-sectional view showing an upper mold and a lower mold used in a method of manufacturing a resin molded capacitor according to Embodiment 3 of the present invention.

Next, similarly to Embodiment 1, a method of manufacturing a resin molded capacitor is described as a method of manufacturing a resin molded electronic component according to Embodiment 3 of the present invention. First, a structure of a mold set used in this manufacturing method is described with reference to FIG. 25. FIG. 25 is a cross-sectional view showing an upper mold and a lower mold that constitute a mold set.

The mold set used in the method of manufacturing a resin molded capacitor in this embodiment is formed of movable upper mold 71, stationary lower mold 72, and plunger 74. Lower mold 72 is disposed facing toward upper mold 71, and plunger 74 is disposed within pot 73 provided in lower mold 72.

According to the manufacturing method of this embodiment, norbornene based resin is injected and filled, using plunger 74, into a cavity defined by upper mold 71 and lower mold 72 after upper mold 71 and lower mold 72 are fastened. An exterior packaging body of a capacitor element laminated body is molded by curing the norbornene based resin in this cavity. This manufacturing method and a finished resin molded capacitor will be later described in detail with reference to FIG. 34A. Here, an up-down relation between components shown in FIG. 25 corresponds to an actual up-down relation when the manufacturing method of this embodiment is put into practice.

In a bottom surface of upper mold 71, two first recesses 75 opening downward are provided. Further, upper mold 71 is provided with guiding pin holes 79 respectively on a side outward from two first recesses 75. Each first recess 75 is designed to have a shape whose diameter gradually decreases upwardly from the opening provided in the bottom surface of upper mold 71. Here, the shape of first recesses 75 can be such that the diameters at the opening and the top surface are the same. Specifically, the shape of a hollow portion of first recess 75 can be quadrangular prismatic or regular cuboid.

Substantially in the center of the top surface of first recess 75, upper ejector pin hole 76 that communicates to first recess 75 is provided. Upper ejector pin 77 is provided within upper ejector pin hole 76 with slight gap 78 from an inner wall of upper ejector pin hole 76. Upper ejector pin 77 is reciprocable along the vertical direction by a mechanism that is not shown.

A top surface of lower mold 72 is provided with two second recesses 80 that open upwardly so as to face toward first recesses 75 of upper mold 71. Each second recess 80 is designed to have a shape whose diameter gradually decreases downwardly from its opening.

Further, under each second recess 80, lower mold 72 is provided with pot 73 opening toward corresponding second recess 80. Specifically, pot 73 is a hollow cavity opening toward second recess 80 and provided at a position corresponding to a bottom surface of second recess 80. Pot 73 has a shape of a square tube. Plunger 74 slidable along the vertical direction is provided inside pot 73.

Plunger 74 has columnar portion 74A having a shape of a prismatic column and tapered pressurizing portion 74B having a planar top end surface that is integrally provided on a top end of columnar portion 74A. An outer circumference portion around the top end surface of pressurizing portion 74B is brought into contact with an inner wall of pot 73.

Here, according to this embodiment, each second recess 80 represents a portion from the opening in the top surface of lower mold 72 to a top end portion of pot 73 having the shape of a square tube, that is a top end surface of pressurizing portion 74B of plunger 74 in a state shown in FIG. 25.

Excess resin pool 81 is provided between two second recesses 80 in lower mold 72. Excess resin pool 81 is a depression provided in the top surface of lower mold 72 next to second recesses 80 in order to pool an excessive resin precursor overflowed from the cavity when molding an exterior packaging body. Excess resin pool 81 opens toward a surface at which upper mold 71 and lower mold 72 are brought into contact with each other. Excess resin pool 81 has a shape whose diameter gradually decreases from top to bottom, similarly to the shape of second recess 80, but its depth is shallower than that of second recess 80. Further, substantially in the center of a bottom of excess resin pool 81, lower ejector pin 82 that is movable vertically is provided. Lower ejector pin 82 has a tapered shape whose diameter gradually increases from bottom to top. Lower ejector pin 82 is provided in order to take the excess resin pooled in excess resin pool 81 outside after the exterior packaging body of the resin molded capacitor is molded.

Meanwhile, second recess 80 and excess resin pool 81 have the shape whose diameter gradually decreases from top to bottom; however the shape is not limited thereto. Specifically, similarly to the case of first recesses 75, the shape of second recess 80 and excess resin pool 81 can be such that the diameters at the upper opening and the bottom surface are the same.

Further, a hole is provided in the center of upper mold 71, and buffer pin 84 movable vertically is disposed within the hole. The hole in which buffer pin 84 is disposed is positioned so as to communicate with excess resin pool 81 when upper mold 71 and lower mold 72 are fastened.

Further, in lower mold 72, two cylindrical guiding pins 83 are provided upright integrally with lower mold 72 on an outward side of two second recesses 80, respectively. Guiding pins 83 are used when positioning laminated body 12 along with guiding pin holes 79. Outer circumferences of top end surfaces of guiding pins 83 are chamfered, and this facilitates insertion into guiding pin holes 79 of upper mold 71 and through holes of the lead frame. Alternatively, forming the top end of each guiding pin 83 substantially semispherical also provides the same effect.

Heater 71H and temperature sensor 71S are embedded in upper mold 71, and heater 72H and temperature sensor 72S are embedded in lower mold 72. As will be described later, it is possible to control the temperatures of lower mold 72 and upper mold 71 using the heaters and the temperature sensors. Specifically, heater 71H and temperature sensor 71S constitute a first temperature control mechanism capable of controlling the temperature of upper mold 71, and heater 72H and temperature sensor 72S constitute a second temperature control mechanism capable of controlling the temperature of lower mold 72. As described in Embodiment 1, the structures of the first temperature control mechanism and the second temperature control mechanism are not limited to the above.

The material of upper mold 71, lower mold 72 is the same as that of lower mold 1, middle mold 2, and upper mold 3 according to Embodiment 1.

Figure 26A:
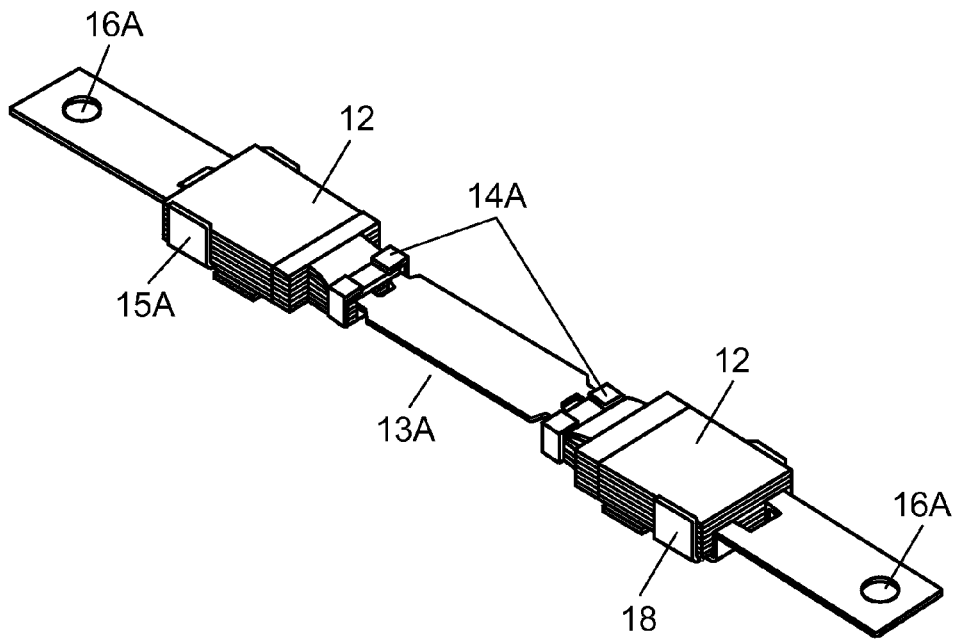
FIG. 26A is a perspective view showing a structure of capacitor element laminated bodies and a lead frame used in the method of manufacturing a resin molded capacitor according to Embodiment 3 of the present invention.

Next, a structure of the capacitor element laminated bodies and the lead frame according to this embodiment are described with reference to FIG. 26A and FIG. 26B. FIG. 26A is a perspective view showing the capacitor element laminated bodies to which the lead frame is attached, and FIG. 26B is a side view showing the capacitor element laminated body to which the lead frame is attached.

Figure 26B:
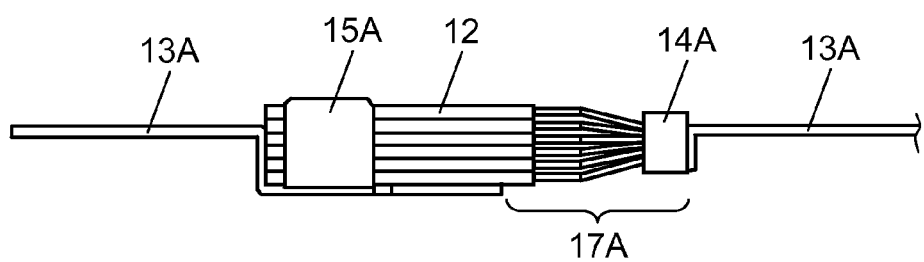
FIG. 26B is a side view showing a capacitor element laminated body connected with the lead frame shown in FIG. 26A.

As shown in FIG. 26B, two capacitor element laminated bodies (hereinafter referred to as laminated body) 12 and lead frame 13A constitute a combined body. Specifically, two laminated bodies 12 are connected with lead frame 13A. First folded portions 14A of lead frame 13A are folded so as to hold positive electrode of each laminated body 12, and fixedly connected to corresponding laminated body 12 by resistance welding or laser welding. On the other hand, second folded portions 15A are folded along a laminating direction of negative electrode of laminated body 12, and fixedly connected to corresponding laminated body 12 by a conductive silver paint. As described above, lead frame 13A and each laminated body 12 are connected in a manner similar to the connection between lead frame 13 and laminated body 12 according to Embodiment 1.

Each laminated body 12 is formed by laminating a plurality of capacitor elements 18 as described in Embodiment 1 with reference to FIG. 4C. The connection between capacitor elements 18 and second folded portions 15A is also the same as that in Embodiment 1.

Circular through holes 16A are provided respectively near both ends across long sides of lead frame 13A. Through holes 16A are provided so that guiding pins 83 of lower mold 72 described above are inserted. The diameter of through holes 16A is set to be slightly greater than the diameter of guiding pins 83 such that through holes 16A are fitted with corresponding guiding pins 83.

As shown in FIG. 26B, lead frame 13A is separated at separating section 17A. As will be later described, separating lead frame 13A by separating section 17A prevents a short circuit between a positive terminal 29A and negative terminal 30A of the resin molded capacitor as a finished product. This structure is also the same as that of lead frame 13 according to Embodiment 1.

Further, lead frame 13A is configured to horizontally extend from both ends across the longitudinal direction of laminated body 12 at a height substantially ½ of laminated body 12 by going through a bending process.

Figure 27:
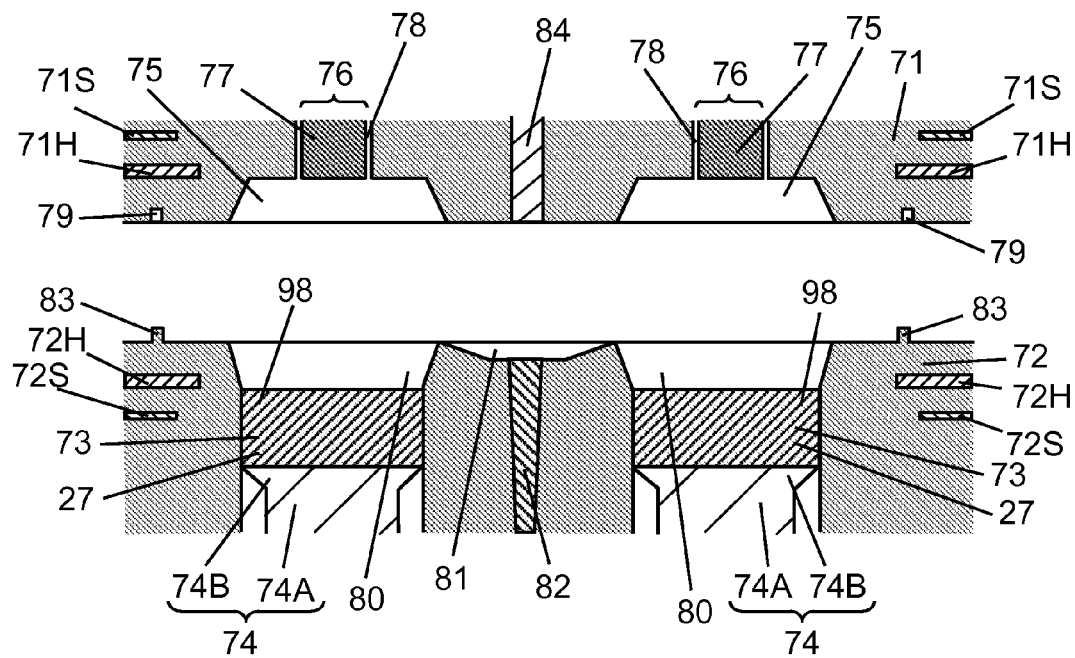
FIG. 27 is a cross-sectional view showing a first step in the method of manufacturing a resin molded capacitor according to Embodiment 3 of the present invention.
Figure 28:
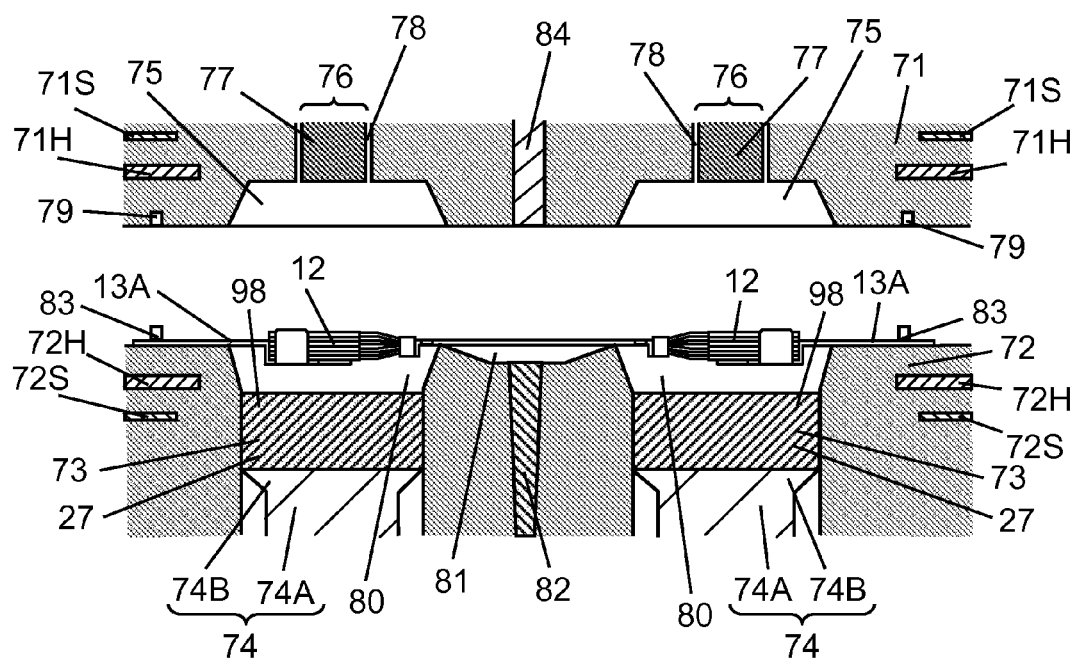
FIG. 28 is a cross-sectional view showing a second step following the first step shown in FIG. 27.
Figure 29:
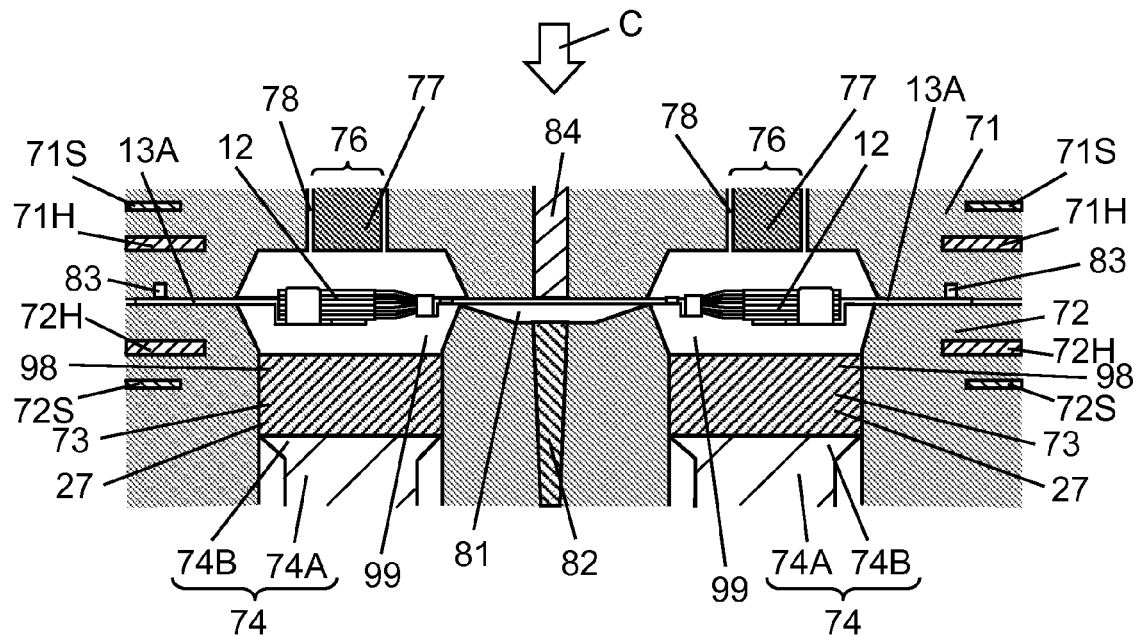
FIG. 29 is a cross-sectional view showing a third step following the second step shown in FIG. 28.
Figure 30:
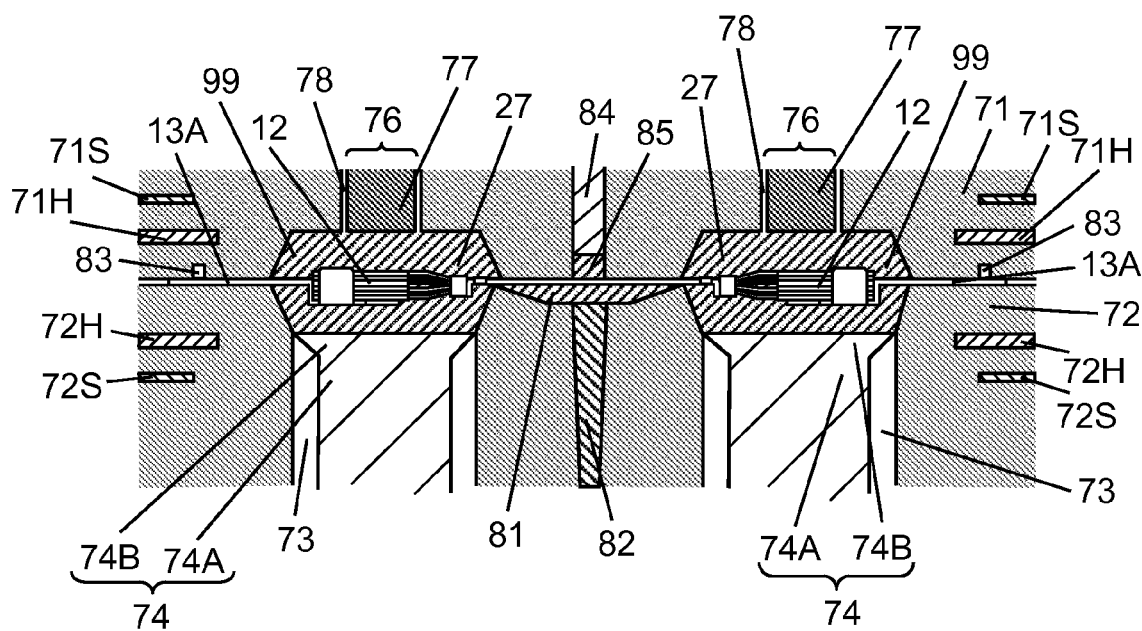
FIG. 30 is a cross-sectional view showing a fourth step following the third step shown in FIG. 29.
Figure 31:
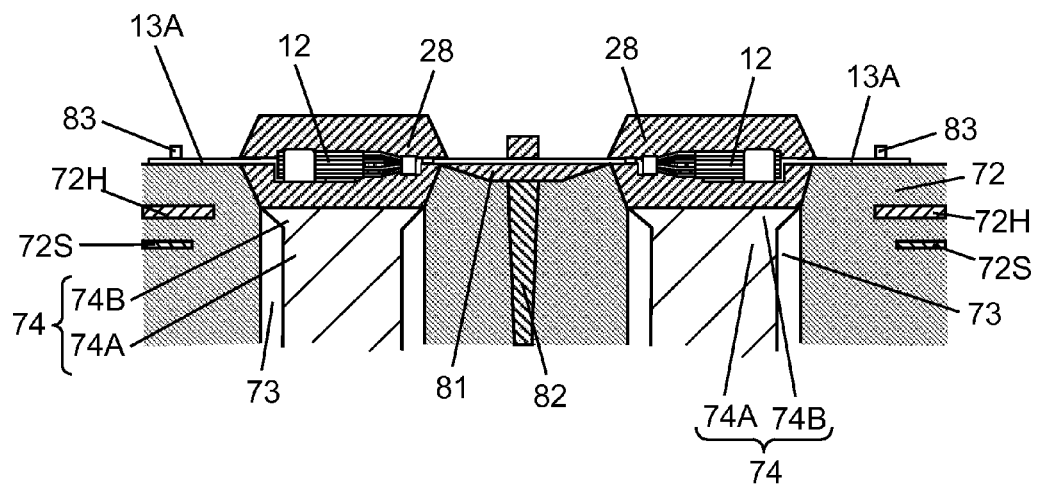
FIG. 31 is a cross-sectional view showing a fifth step following the fourth step shown in FIG. 30.
Figure 32:
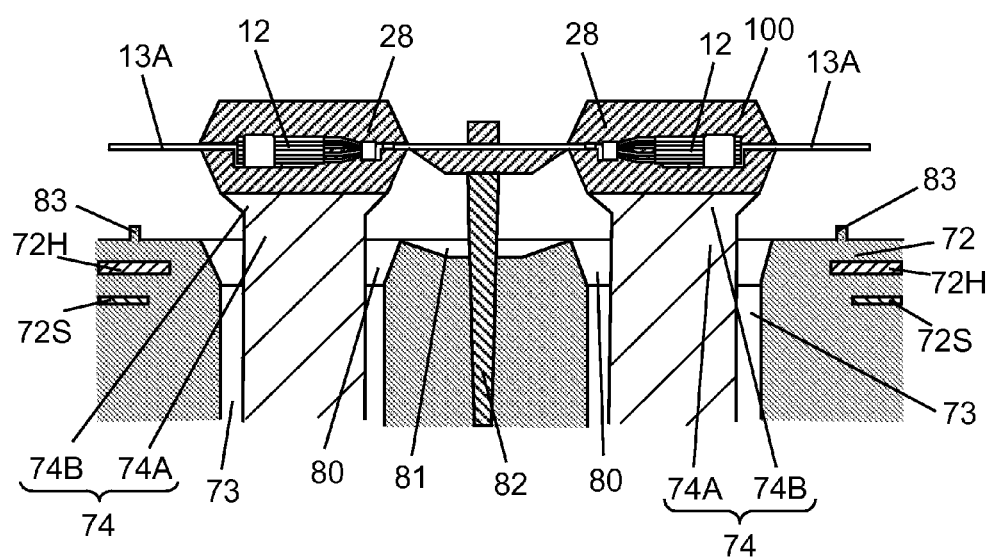
FIG. 32 is a cross-sectional view showing a sixth step following the fifth step shown in FIG. 31.

Next, the method of manufacturing a resin molded capacitor according to this embodiment is described with reference to FIG. 27 to FIG. 32. FIG. 27 is a cross-sectional view showing a first step of injecting norbornene based resin 27, and FIG. 28 is a cross-sectional view showing a second step of placing the combined body of laminated bodies 12 and lead frame 13A on lower mold 72. FIG. 29 is a cross-sectional view showing a third step of fastening upper mold 71 and lower mold 72, and FIG. 30 is a cross-sectional view showing a fourth step of covering norbornene based resin 27 over laminated bodies 12. FIG. 31 is a cross-sectional view showing a fifth step of separating upper mold 71 from lower mold 72, and FIG. 32 is a cross-sectional view showing a sixth step of taking laminated bodies 12 after molding the exterior packaging body out of the mold set. Here, in FIG. 28 through FIG. 32, the mold set is shown by the cross-sectional view, and the combined body of laminated bodies 12 and lead frame 13A are shown by its side surface, in order to clearly show each step.

In the first step, plunger 74 in a state shown in FIG. 25 is moved down to a predetermined position. With this operation, resin reservoir 98 is provided above the top surface of pressurizing portion 74B of plunger 74 in pot 73 in advance. Resin reservoir 98 is a space positioned above plunger 74 in pot 73. Second recess 80 and resin reservoir 98 provided in pot 73 constitute a cavity with an open top surface that is provided in lower mold 72 as a first mold.

Then, a specific amount of liquid norbornene based resin 27 whose viscosity at 40° C. is 10 Pa·s or smaller is injected by instillation into resin reservoir 98 in pot 73 using such as a nozzle, providing a state as shown in FIG. 27. At this time, an outer circumference portion of the top end of pressurizing portion 74B is brought into contact with the surface of the inner wall of pot 73, and there is no gap therebetween. Accordingly, norbornene based resin 27 is reserved in resin reservoir 98 without dropping on a back side of pressurizing portion 74B.

Even in this case, due to abrasion or the like, there may be a gap between the outer circumference portion of the top end of pressurizing portion 74B and the surface of the inner wall of pot 73. However, in the first step, the temperature of lower mold 72 is controlled to be lower than the curing temperature of norbornene based resin 27 by the second temperature control mechanism configured by heater 72H and temperature sensor 72S, and columnar portion 74A of plunger 74 is spaced apart from the surface of the inner wall of pot 73. Accordingly, in this case, even if norbornene based resin 27 drops on the back side of pressurizing portion 74B, dropped norbornene based resin 27 is not cured in pot 73, but drops further below pot 73, and finally to an exterior of pot 73. With this structure, the mold set according to this embodiment can prevent cured norbornene based resin 27 from remaining in pot 73.

Further, it is preferable that an amount of injected liquid norbornene based resin 27 be slightly greater than a content volume of the cavity that will be later described. Therefore, it is preferable to control the position to which plunger 74 is moved down so that a volume of resin reservoir 98 is slightly greater than the content volume of the cavity. As shown in FIG. 27, resin reservoir 98 in this embodiment is defined as a space between the bottom surface of second recess 80 and pressurizing portion 74B of plunger 74. However, the present invention is not limited thereto. Specifically, as described above, if the amount of injected norbornene based resin 27 is slightly greater than the content volume of the cavity, the top end of resin reservoir 98 can be at a position higher than or lower than the bottom surface of second recess 80.

In the first step, the temperature of lower mold 72 is set to be the curing temperature of norbornene based resin 27 or lower. Specifically, it is desirable that the temperature of lower mold 72 be set to be 40° C. or higher and 60° C. or lower. The reason and the method for setting the temperature in the above manner are the same as those for lower mold 1 according to Embodiment 1.

Here, it is desirable that the nozzle and the like used for injecting norbornene based resin 27 into resin reservoir 98 be always cooled in order to prevent norbornene based resin 27 from being cured in the nozzle and the like due to the heat from the mold set.

In the second step, as shown in FIG. 28, the combined body of laminated bodies 12 and lead frame 13A attached to laminated bodies 12 is placed on the top surface of lower mold 72. At this time, guiding pins 83 provided on the top surface of lower mold 72 are inserted into through holes 16A of lead frame 13A, and thus the placement is carried out. By this operation, lead frame 13A and laminated bodies 12 are accurately fixed and positioned at predetermined positions. Although more than two guiding pins 83 can be provided, it is possible to accurately position lead frame 13A and laminated bodies 12 on lower mold 72 by providing at least two guiding pins 83. According to this embodiment, in the state in which the combined body of laminated bodies 12 and lead frame 13A are placed on lower mold 72, an area of the opening of pot 73 is greater than a projected area of laminated body 12 from above in a state that laminated body 12 is placed on the top surface of lower mold 72. With the second step, each of laminated bodies 12 is accurately accommodated in second recess 80.

As described above, by the first and the second steps, each of laminated bodies 12 and norbornene based resin 27 are inserted into the cavity with the open top surface, which is the space provided by communicating resin reservoir 98 in pot 73 formed in lower mold 72 with second recess 80. The space corresponds to the cavity with an open top surface.

In the third step, first, as indicated by arrow C in FIG. 29, upper mold 71 is moved downward from above lower mold 72, and upper mold 71 and lower mold 72 are clamped (fastened). Specifically, upper mold 71 as the second mold is positioned so as to sandwich laminated bodies 12 and norbornene based resin 27. At this time, guiding pins 83 projecting from through holes 16A of lead frame 13A are fitted into guiding pin holes 79 of upper mold 71. Accordingly, upper mold 71 is accurately positioned with respect to lower mold 72 and lead frame 13A. Clamping in the state in which lower mold 72 and upper mold 71 are accurately positioned in this manner causes an opening end portion of each first recess 75 of upper mold 71 overlaps with an opening end portion of corresponding second recess 80 of lower mold 72 via lead frame 13A therebetween. Therefore, lead frame 13A is firmly clamped between lower mold 72 and upper mold 71, and each laminated body 12 is positioned within cavity 99 defined by corresponding first recess 75 and second recess 80.

Upper mold 71 is heated in advance before the third step, using the first temperature control mechanism configured by heater 71H and temperature sensor 71S, up to the curing temperature of norbornene based resin 27 or higher. Specifically, upper mold 71 is heated up to the temperature of 80° C. or higher and 120° C. or lower.

In the fourth step, as shown in FIG. 30, plunger 74 is moved upward at a constant pressure by a pressure control mechanism that is not depicted, and caused to slide up to a predetermined position. According to this embodiment, plunger 74 is moved upward up to a lower end of second recess 80. With this operation, each laminated body 12 and norbornene based resin 27 are pressed between lower mold 72 and upper mold 71.

In the beginning of the fourth step, norbornene based resin 27 has already started curing due to the heat from lower mold 72. However, the temperature of lower mold 72 is from 40° C. to 60° C., which is equal to or lower than the curing temperature of norbornene based resin 27. Accordingly, in the beginning of the fourth step, the viscosity of norbornene based resin 27 is as low as a value from $2 \times 10^{-1}$ Pa·s to 10 Pa·s. Therefore, in the fourth step, it is possible to facilitate pressurization and fluidization of norbornene based resin 27 by moving plunger 74 upward.

By moving plunger 74 upward in this manner, norbornene based resin 27 in resin reservoir 98 in pot 73 is pressurized and fluidized, and injected and filled within cavity 99 defined by corresponding first recess 75 and second recess 80. The position to which plunger 74 is moved upward corresponds to a position at which the top surface of pressurizing portion 74B is substantially flush with the bottom surface of second recess 80. With this operation, it is possible to favorably form the external appearance of the resin molded capacitor as a finished product, and it is possible to prevent an occurrence of a faulty external appearance. Further, as described above, as the viscosity of norbornene based resin 27 is low at this time point, and thus the mechanical stress applied to each laminated body 12 and lead frame 13A is small, it is possible to reduce possibility of breakage and deformation in each laminated body 12 and lead frame 13A. Meanwhile, the outer circumference portion of the top end of pressurizing portion 74B moves upward while sliding against the surface of the inner wall of pot 73. Therefore, liquid tightness of resin reservoir 98 is maintained, and it is not likely that norbornene based resin 27 drops on the back side of pressurizing portion 74B.

As described previously, norbornene based resin 27 of the amount that is slightly greater than the content volume of cavity 99 has been injected in the resin reservoir 98. Accordingly, norbornene based resin 27 injected and filled within cavity 99 spreads into every corner of cavity 99. Therefore, it is possible to spread norbornene based resin 27 into minute portions of a molded piece that is small and the shape of the portions to be filled by norbornene based resin 27 is complex as in the case of laminated body 12.

Then, the heat from upper mold 71 that has been heated up to the curing temperature of norbornene based resin 27 or higher is transmitted norbornene based resin 27 filled into cavity 99, and norbornene based resin 27 is cured in the shape of cavity 99. That is, in the fourth step, each laminated body 12 and norbornene based resin 27 are pressed between lower mold 72 as the first mold and upper mold 71 as the second mold, and norbornene based resin 27 is cured at the temperature of upper mold 71. At this time, the temperature of upper mold 71 is set to be higher than the temperature of lower mold 72.

Each cavity 99 communicates with excess resin pool 81 provided between two cavities 99 via communicating holes that are not depicted. Therefore, excessive norbornene based resin 27 that overflows from each cavity 99 is discharged to excess resin pool 81 through each of the communicating holes.

Further, when excessive norbornene based resin 27 that overflows from each cavity 99 is further discharged to excess resin pool 81 after excessive norbornene based resin 27 that has overflowed from each cavity 99 is filled in excess resin pool 81, buffering portion 85 is formed. Buffering portion 85 is provided in such a manner that buffer pin 84 is pushed upward by norbornene based resin 27 that has been discharged to excess resin pool 81. Specifically, a pressure is applied to norbornene based resin 27 in excess resin pool 81 by norbornene based resin 27 being further discharged to excess resin pool 81 after norbornene based resin 27 is filled in excess resin pool 81. In response to the pressure from norbornene based resin 27, buffer pin 84 slides upward. As a result, buffering portion 85 is formed between a lower end surface of buffer pin 84 and excess resin pool 81, allowing to contain more excessive norbornene based resin 27. In this manner, a part of excessive norbornene based resin 27 is discharged to buffering portion 85.

Further, it is possible to discharge gas in each cavity 99 to excess resin pool 81 once, and then externally through a gap between buffer pin 84 and the hole in which buffer pin 84 is inserted. In order to operate buffering portion 85 in the above manner, for example, an elastic member such as a spring that is not shown in the drawing can be provided behind buffer pin 84 (upper portion in FIG. 30). According to this embodiment, buffer pin 84 is provided in upper mold 71; however the location is not limited thereto. Buffer pin 84 can be provided in lower mold 72, or both in upper mold 71 and lower mold 72.

Gas within each cavity 99 is externally discharged through slight gap 78 between the inner wall of upper ejector pin hole 76 and upper ejector pin 77. With this structure, it is possible to prevent the gas from remaining in cavity 99 when norbornene based resin 27 is filled into cavity 99.

Meanwhile, it is imaginable that norbornene based resin 27 leaks into gap 78. However, gap 78 has only a very small width, and, in addition, norbornene based resin 27 starts curing and its viscosity is increased in this step. Accordingly, it is not likely that norbornene based resin 27 leaks into gap 78. Further, in order to prevent a leakage of norbornene based resin 27 into gap 78, a size of communicating hole from cavity 99 to excess resin pool 81 can be relatively large. With this design, norbornene based resin 27 is preferentially discharged to excess resin pool 81 through the communicating hole instead of leaking to gap 78.

In addition, the removal of the gas within cavity 99 is not limited to the above structure. For example, instead of providing gap 78, it is possible to form a channel communicating from excess resin pool 81 to a vacuuming pump keeping an air tight state within cavity 99, and to perform vacuuming by using the vacuuming pump.

Next, the process proceeds to the fifth step after plunger 74 is moved up to the predetermined position in the fourth step and this state is maintained for about 10 seconds. Norbornene based resin 27 is sufficiently cured during this period, as norbornene based resin 27 can be cured in a short period of time.

In the fifth step, as shown in FIG. 31, upper mold 71 shown in FIG. 30 is moved upward and removed from lower mold 72. At this time, norbornene based resin 27 is cured into the shape of cavity 99 and forms exterior packaging body 28. In the fifth step, laminated body 12 and lead frame 13A covered with exterior packaging body 28 are placed on lower mold 72.

In the sixth step, as shown in FIG. 32, plunger 74 is further moved up to the predetermined position from the position shown in the fourth step or the fifth step. As the position up to which plunger 74 is moved, it is preferable to select a position at which at least the top end of plunger 74 comes above the top surface of lower mold 72 in order to facilitate the taking out process. With this operation, molded body 100 of laminated bodies 12 and lead frame 13A covered with exterior packaging body 28 is taken out of lower mold 72.

As second recess 80 is configured to have the diameter that gradually decreases downwardly from its opening, exterior packaging body 28 and the inner wall of second recess 80 are not likely brought into contact with each other in the sixth step, and possibility of an occurrence of a faulty external appearance is reduced.

Further, lower ejector pin 82 moves upward coinciding with the upward movement of plunger 74. With this, the excess resin that has been pooled and cured in excess resin pool 81 is also taken out.

Here, in this embodiment, in order to clearly show the operation of taking the excess resin out of the lower ejector pin 82, a case in which the excess resin has overflowed to excess resin pool 81 is described. Other than the case of this embodiment, a case in which the amount of the excess resin is very little and pooled in excess resin pool 81 only partially is conceivable. In such a case, it is not possible to extrude the excess resin upward by the top surface of lower ejector pin 82 being brought into contact with the cured excess resin as in the example shown in FIG. 32. As the amount of the excess resin present in excess resin pool 81 is small, the top surface of lower ejector pin 82 is directly brought into contact with lead frame 13A. Even when the top surface of lower ejector pin 82 is directly brought into contact with lead frame 13A in this manner, it is possible to take molded body 100 and the small amount of the excess resin out of the mold set without causing any problem in the fourth step or to molded body 100.

Figure 33:
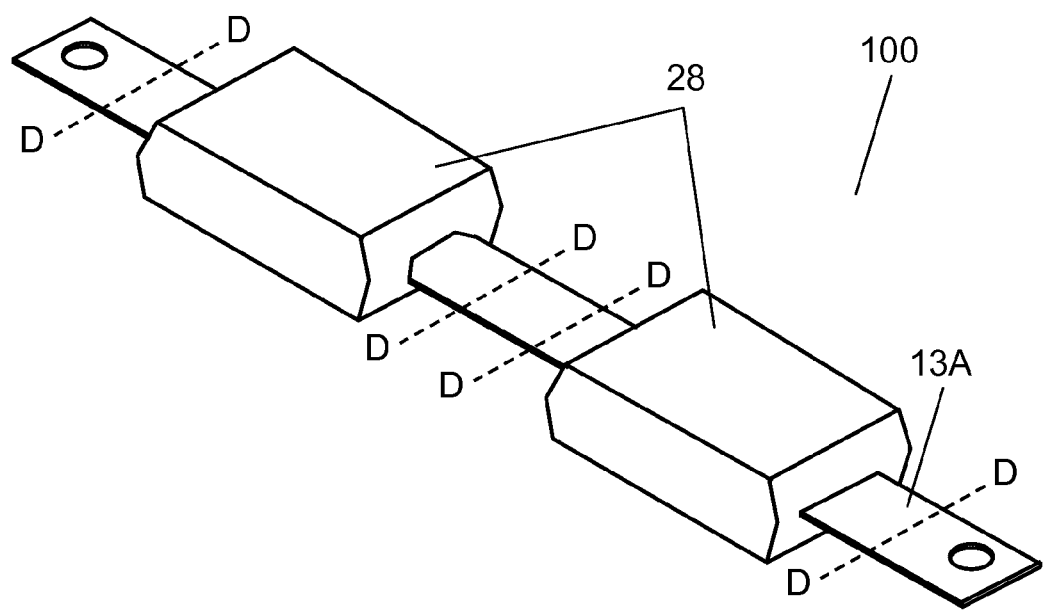
FIG. 33 is a perspective view showing the capacitor element laminated bodies covered with exterior packaging bodies by the method of manufacturing a resin molded capacitor according to Embodiment 3 of the present invention.
Figure 34A:
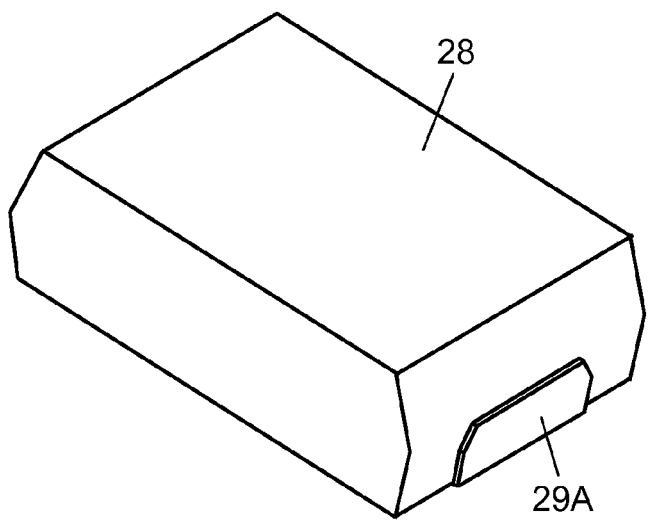
FIG. 34A is a perspective view showing a finished resin molded capacitor by the manufacturing method of Embodiment 3.
Figure 34B:
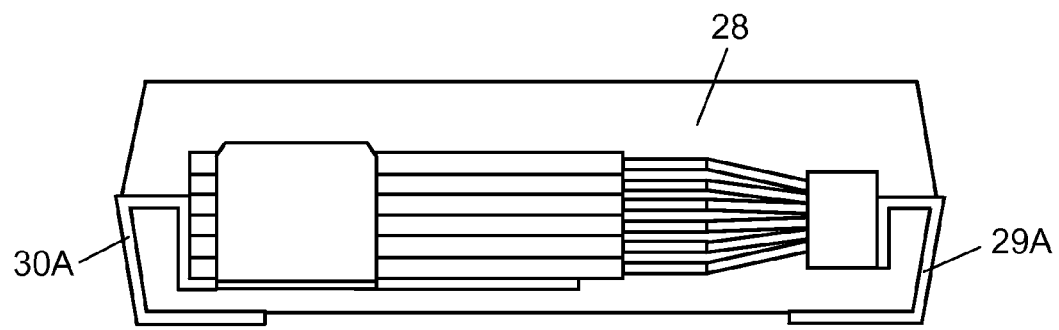
FIG. 34B is a transparent front view showing the resin molded capacitor shown in FIG. 34A.

Next, a structure of the resin molded capacitor molded according to the manufacturing method of this embodiment is described with reference to FIG. 33 and FIG. 34. FIG. 33 is a perspective view showing molded body 100. FIG. 34A is a perspective view and FIG. 34B is a see-through view, both showing a finished resin molded capacitor. In FIG. 34B, in order to clearly show the structure of the resin molded capacitor, exterior packaging body 28 is shown see through.

By going through these steps as described above, molded body 100 formed of laminated bodies 12 and lead frame 13A that are covered with exterior packaging body 28 molded by cured norbornene based resin 27 is manufactured as shown in FIG. 33. Further, lead frame 13A is cut appropriately at predetermined positions indicated by broken lines D-D in FIG. 33, and is bent to exterior packaging body 28 at these positions, thereby finishing the resin molded capacitor as shown in FIG. 34A.

As shown in FIG. 34A, a shape of a side surface of exterior packaging body 28 of the resin molded capacitor manufactured according to the manufacturing method of this embodiment is in the shape of cavity 99, that is, substantially in a hexagonal shape. However, considering usability in mounting, the shape of exterior packaging body 28 of the resin molded capacitor is preferably near a quadrangular prism. Therefore, it is preferable that the shapes of first recess 75 and second recess 80 be such that the opening and the bottom surface of the respective recesses have similar size to an extent in which exterior packaging body 28 is left untouched when taking out laminated body 12 covered with exterior packaging body 28.

As shown in FIG. 34B, the bent portions of lead frame 13A become positive terminal 29A and negative terminal 30A of this resin molded capacitor. Positive terminal 29A and negative terminal 30A are provided respectively for both end surfaces across the longitudinal direction of the resin molded capacitor as well as for a lower surface of the resin molded capacitor. As lead frame 13A is previously provided with separating section 17A, positive terminal 29A is separated from negative terminal 30A, and therefore any short circuit between these terminals is not likely to occur.

According to the manufacturing method of this embodiment, it is also possible to obtain the same effect as those of the manufacturing methods according to Embodiments 1 and 2. Specifically, it is possible to manufacture a resin molded capacitor that is sufficiently covered with the exterior packaging body, and to improve reliability of the resin molded capacitor. This is realized because the temperature of lower mold 72 is set to be lower than the temperature of upper mold 71 by heaters 71H and 72H and temperature sensors 71S and 72S in the third step and the fourth step. In other words, according to the manufacturing method of this embodiment, it is possible to sufficiently fill cavity 99 in FIG. 29 by norbornene based resin 27, and to sufficiently cover laminated body 12.

In particular, compared to the conventional method in which a molding resin is injected through a gate having a relatively small diameter, it is possible to fill norbornene based resin 27 into every corner of cavity 99 within a short period of time. Therefore, it is possible to spread norbornene based resin 27 into minute portions within a short period of time, even in the case of a molded piece according to this embodiment that is small and whose range to be filled by norbornene based resin 27 has a complex shape. Consequently, it is possible to manufacture a highly reliable resin molded capacitor that is sufficiently covered with the exterior packaging body without leaving an uncovered portion, with excellent productivity.

Further, upper mold 71 is heated up to the curing temperature of norbornene based resin 27 or higher in advance before the third step. Then, in the fourth step, the heat from upper mold 71 is transmitted to norbornene based resin 27, and norbornene based resin 27 is cured. Consequently, the curing starts at the same time as norbornene based resin 27 is filled into cavity 99 in the fourth step, and it is possible to manufacture a resin molded capacitor with excellent productivity.

Preferable temperature setting for upper mold 71 and lower mold 72 is the same as in the case of upper mold 42 and lower mold 41 according to Embodiment 2.

Moreover, in the case in which upper mold 71 is heated up to the curing temperature of norbornene based resin 27 or higher in advance in this manner, norbornene based resin 27 that has been filled in cavity 99 is cured in the fourth step sequentially from top to bottom of cavity 99. Specifically, the curing progresses sequentially from an end portion of the product, and an occurrence of the residual stress (stress difference) in norbornene based resin 27 can be extremely suppressed. Therefore, it is possible to reduce the mechanical stress applied to laminated body 12 when curing.

Further, pot 73 opens toward second recess 80, and norbornene based resin 27 is injected into cavity 99 through pot 73. Accordingly, it is possible to inject norbornene based resin 27 at a lower pressure, compared to the conventional manufacturing method in which a molding resin is injected through a gate having a relatively small diameter. Consequently, it is possible to reduce the mechanical stress applied to lead frame 13A and laminated body 12, and to reduce possibility of breakage in lead frame 13A and laminated body 12, and therefore it is possible to manufacture a highly reliable resin molded capacitor.

Further, the area of the opening of pot 73 is greater than the projected area of laminated body 12, thereby further reducing the pressure applied to norbornene based resin 27 when injected into cavity 99. In particular, in the structures of laminated bodies 12 and lead frame 13A according to this embodiment, as described above, lead frame 13A is provided with separating section 17A, and each laminated body 12 is exposed from separating section 17A. Specifically, the portion exposed from separating section 17A of laminated body 12 is in particular susceptible to a mechanical stress, and thus easy to breakage. Therefore, in the structures of laminated bodies 12 and lead frame 13A according to this embodiment, it is important to make the area of the opening of pot 73 to be greater than the projected area of laminated body 12. Here, laminated body 12 in this embodiment is formed by laminating capacitor elements 18, and the projected area of laminated body 12 is the same as that of capacitor elements 18.

Further, in the second step, the combined body of lead frame 13A and laminated bodies 12 is disposed such that lead frame 13A connected to a portion of the bottom surface of laminated bodies 12 faces toward the opening of pot 73. This is because each laminated body 12 is protected from the pressure applied by norbornene based resin 27 by lead frame 13A when injecting and filling norbornene based resin 27 into cavity 99 in the fourth step. With this arrangement, the possibility of breakage in laminated body 12 due to an unnecessary stress is reduced. In laminated body 12 using conductive polymer as a solid electrolyte as in the case of this embodiment, breakage such as cracks that may occur in manufacture can cause a leakage current. Therefore, the handling in the second step as described above is particularly important.

Moreover, as pot 73 opens toward second recess 80 that constitute a part of cavity 99, moving plunger 74 upward pressurizes and injects norbornene based resin 27 in pot 73 directly into cavity 99. Therefore, according to this manufacturing method, it is possible to improve a material yield ratio of the resin molded capacitors. Specifically, as no runner and the like is required, it is not necessary to discard the molding resin for the runner as in the case of the conventional manufacturing method, and it is possible to reduce material loss and improve the material yield ratio.

According to the manufacturing method of this embodiment, it is preferable to use norbornene based resin 27 that is a liquid resin precursor. This is because when the manufacturing method of this embodiment is carried out using a molding resin in tablets or a granular state, there is possibility that an unmelted molding resin is brought into contact with laminated body 12 and breakage occurs in laminated body 12. Using a liquid resin in the manufacturing method of this embodiment in this manner, the possibility that breakage occurs in laminated body 12 is reduced, and the reliability in the resin molded capacitor is increased.

Further, the viscosity of the liquid resin in the beginning of the fourth step is 10 Pa·s or lower. With the viscosity of 10 Pa·s or lower, it is possible to manufacture a highly reliable resin molded capacitor without causing breakage and deformation in laminated body 12 and lead frame 13A. Detailed description for norbornene based resin 27 is the same as that of Embodiment 1.

Further, by moving plunger 74 further upward after the fifth step, molded body 100 is taken out of lower mold 72. With this operation, it is possible to easily take molded body 100 out, and to further improve the productivity.

Next, effects of the structure of the mold set used in the manufacturing method of this embodiment are described. First, lower mold 72 is provided with pot 73 opening toward second recess 80, and the area of the opening of pot 73 is greater than the projected area of laminated body 12. Further, upper mold 71 has the temperature control mechanism that controls the temperature of upper mold 71 to be higher that that of lower mold 72, and lower mold 72 has the temperature control mechanism that controls the temperature of and lower mold 72 to be lower that that of upper mold 71. With this structure, it is possible to manufacture a highly reliable resin molded capacitor at a superior material yield ratio as described above and with excellent productivity.

Further, lower mold 72 has excess resin pool 81 that communicates with second recess 80, and excess resin pool 81 opens toward the contact surface between upper mold 71 and lower mold 72. With this structure, it is possible to easily take out excessive norbornene based resin 27 pooled in excess resin pool 81 in the fifth step.

Further, the temperature of lower mold 72 is controlled to be relatively lower than that of upper mold 71. Accordingly, norbornene based resin 27 discharged in excess resin pool 81 of lower mold 72 is not cured immediately. Therefore, the possibility that norbornene based resin 27 is cured, clogs near the communicating portion of cavity 99 and excess resin pool 81, and hinders discharge of the norbornene based resin 27 to excess resin pool 81 is reduced.

Figure 35:
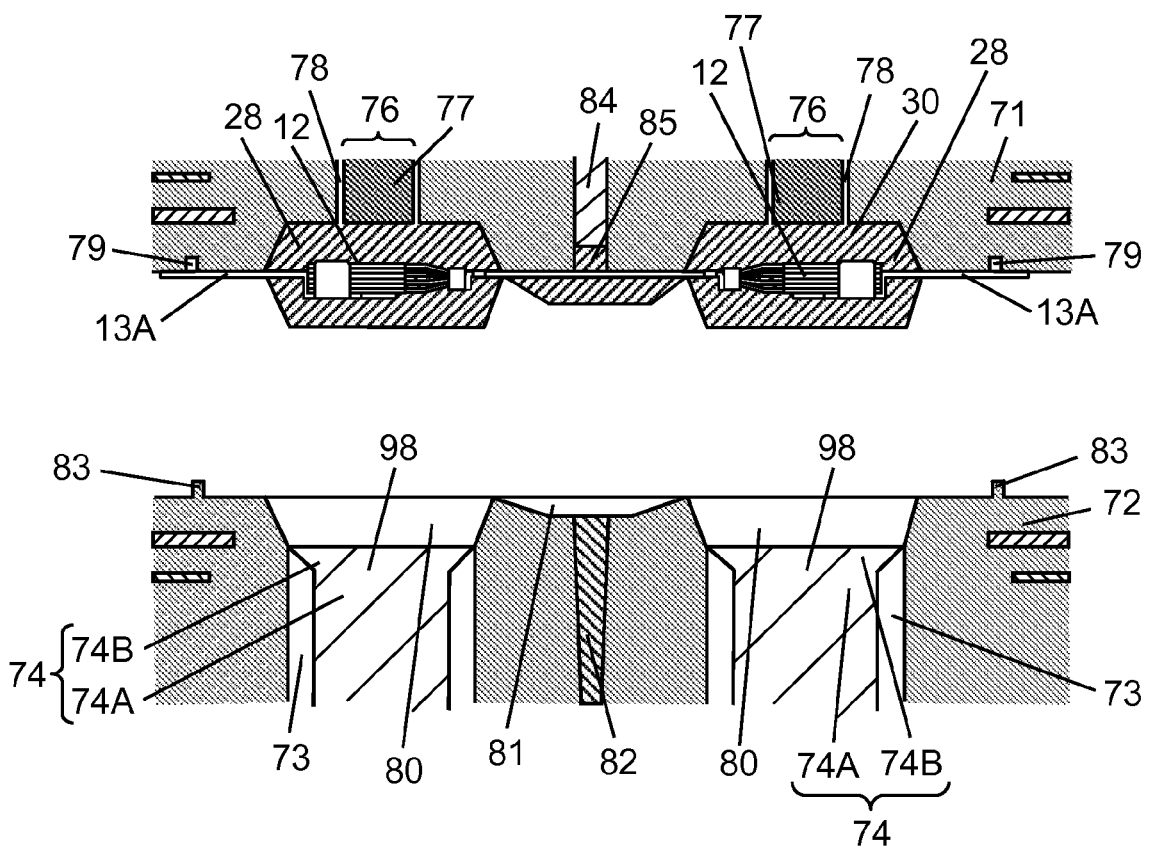
FIG. 35 is a cross-sectional view showing a state in which molded bodies are attached to the upper mold in the fifth step in the method of manufacturing a resin molded capacitor according to Embodiment 3 of the present invention.
Figure 36:
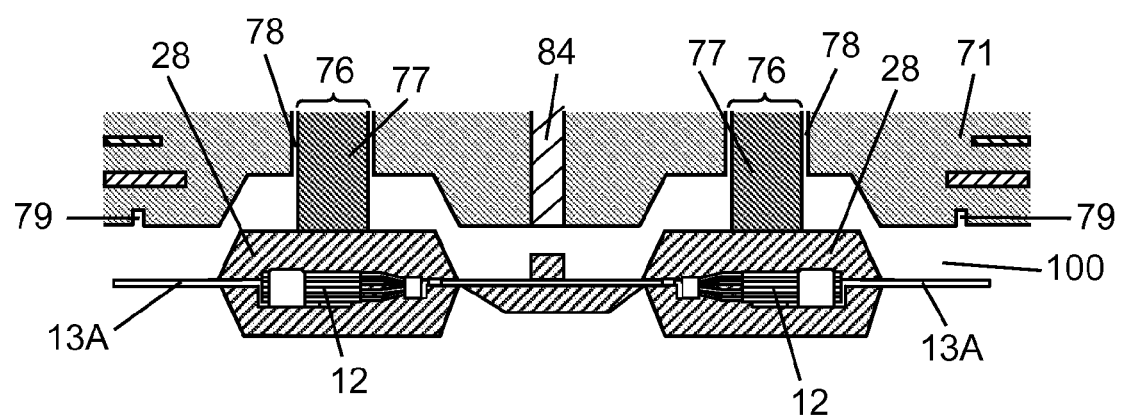
FIG. 36 is a cross-sectional view showing another sixth step following the fifth step shown in FIG. 35.
Figure 36:
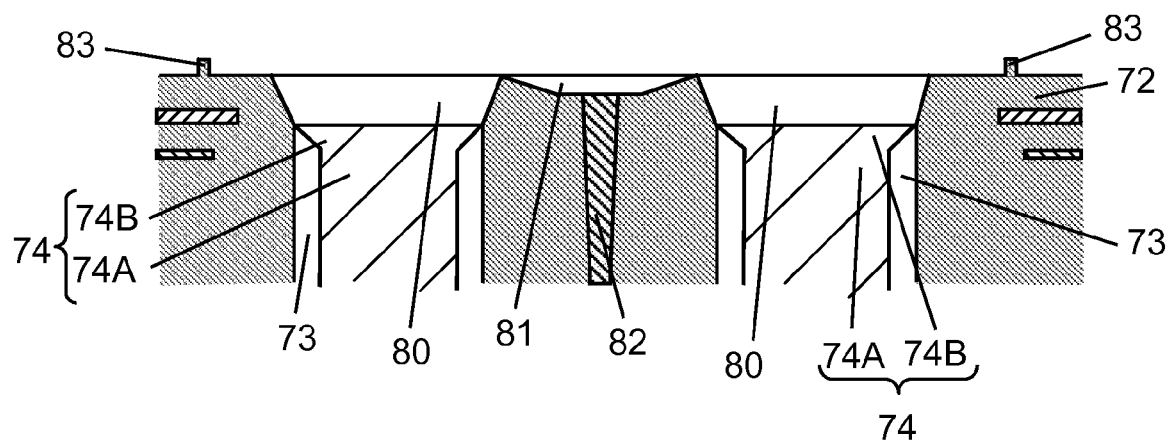
Figure 37:
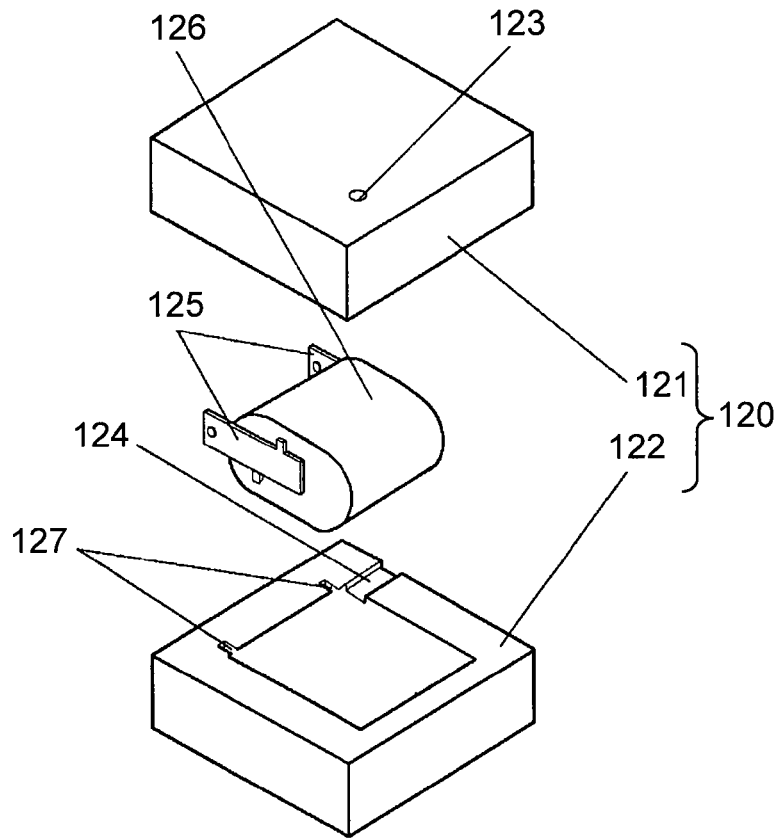
FIG. 37 is a perspective view showing a conventional mold set used for molding an exterior packaging body of a resin molded capacitor.
Figure 38:
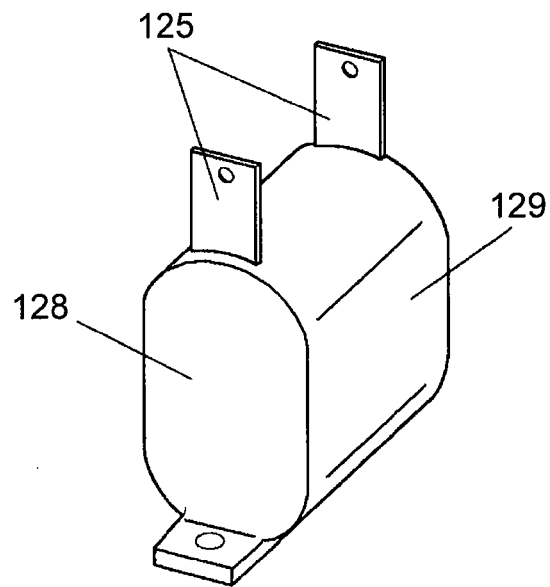
FIG. 38 is a perspective view showing a resin molded capacitor manufactured by a conventional manufacturing method.

Here, an effect of the structure in which upper ejector pin hole 76 communicating with first recess 75 is provided in upper mold 71 and upper ejector pin 77 that is slidable up and down within upper ejector pin hole 76 is provided is described with reference to FIG. 35 and FIG. 36. FIG. 35 is a cross-sectional view showing molded body 100 applied to upper mold 71 in the fifth step, and FIG. 36 is a cross-sectional view showing the sixth step of molded body 100 in the state shown in FIG. 35.

As shown in FIG. 31, molded body 100 is basically placed on lower mold 72 in the fifth step. However, due to an adhesive force of norbornene based resin 27, there is a case in which molded body 100 is applied to upper mold 71 in the fifth step as shown in FIG. 35. In such a case, it is possible to remove molded body 100 from upper mold 71 by moving upper ejector pin 77 downward to take molded body 100 out as shown in FIG. 36.

In addition, as described above, slight gap 78 is provided between upper ejector pin 77 and the wall surface of upper ejector pin hole 76, and gas in cavity 99 is externally discharged through gap 78 in the fourth step. Accordingly, norbornene based resin 27 can easily fill within cavity 99.

As described above, it is possible to improve the material yield and to manufacture a highly reliable resin molded capacitor according to the manufacturing method and the mold set of this embodiment.

Meanwhile, after norbornene based resin 27 is injected into resin reservoir 98 in the first step, the combined body of laminated bodies 12 and lead frame 13A is placed on lower mold 72 in the second step according to this embodiment. However, the order of these steps is not limited to the above order.

Specifically, the combined body of laminated bodies 12 and lead frame 13A can be first placed on lower mold 72, and then, norbornene based resin 27 can be injected into resin reservoir 98 up to a predetermined level through a gap between lead frame 13A and the opening end portion of lower mold 72, for example. Therefore, in this case, the first step is carried out after the second step.

Further, this embodiment has described an example in which two resin molded capacitors are manufactured at the same time; however the present invention is not limited thereto. It is possible to apply the present invention to a case in which a single resin molded capacitor is manufactured, or to a case in which more than two pluralities of resin molded capacitors are manufactured at the same time, and the effects similarly to those described above can be obtained.

Further, similarly to Embodiment 2, when laminated body 12 and lead frame 13A are connected such that lead frame 13A extends from the lower surface of laminated body 12 parallelly to the lower surface of laminated body 12, it is not necessary to provide first recess 75 in upper mold 71.

Note here that the uncured norbornene based resin is taken as an example of a liquid resin precursor in the above description. However, the present invention is not limited to such a material as long as the viscosity of the curing material at 40° C. is equal or lower than 10 Pa·s. For example, a liquid epoxy resin can be used. In this case, the temperature of lower molds 1, 41, and 72 can be set to be 80° C. or higher and 120° C. or lower, the temperature of middle mold 2 can be set to be 110° C. or higher and 150° C. or lower, and the temperature of upper molds 3, 42, and 71 can be set to be 140° C. or higher and 180° C. or lower.

Note here that the laminated body configured by the solid electrolytic capacitor elements is taken as an example of the element in the above description. However, the present invention is not limited to this, and other electronic components such as coils can be used as the element.

Industrial Applicability

According to the manufacturing method of the present invention, it is possible to manufacture a resin molded electronic component that is sufficiently covered with an exterior packaging body, and to improve reliability of the resin molded electronic component. Further, a norbornene based resin used as the exterior packaging body of the resin molded electronic component exhibits superior moisture resistance, strength, and impact resistance. With those properties, the resin molded electronic component manufactured according to the manufacturing method of the present invention can suitably serve as a electronic component used for various electronic devices, electrical apparatuses, industrial instruments, automobiles, and the like.

The invention claimed is:

1. A method of manufacturing a resin molded electronic component using a mold comprising upper and lower sections, the lower mold having a cavity with an open top, the method comprising:
    inserting an electronic component element and a liquid resin precursor including a norbornene monomer into the lower mold cavity, the lower mold being heated to between 40° C. and 60° C., inclusive and the resin precursor having a viscosity of 10 Pa·s or lower at 40° C.;
    arranging the upper mold so as to sandwich the inserted element and resin precursor within the lower mold cavity, the arranged upper mold being heated to between 80° C. and 120° C., inclusive so as to initiate curing of the resin precursor progressing from the arranged upper mold, and the lower mold remaining heated to between 40° C. and 60°, inclusive during said arranging and curing; and
    pressing the sandwiched element and resin precursor between the upper and lower molds during said curing.

2. The method of claim 1, wherein the element is a capacitor element laminated body.

3. The method of claim 1, wherein the lower mold comprises a side wall and a bottom slidable along the side wall vertically, the cavity being surrounded by the side wall.

4. The method of claim 3, wherein said inserting comprises first injecting the resin precursor into the cavity and then placing a lead frame connected to the element on a circumferential edge portion of the side wall so as to embed the connected element into the injected resin precursor.

5. The method of claim 3, wherein said pressing comprises sliding the lower mold bottom vertically upward along the side wall.

6. The method of claim 3, wherein the side wall, upper mold, or both are provided with through holes through which air and excess resin precursor discharge to outside of the cavity as a result of said pressing.

7. The method of claim 1, wherein the electronic component is connected to a lead frame comprising through holes receiving guiding pins of the lower mold as a result of said inserting.

8. The method of claim 7, wherein the guiding pins project through the through holes into guiding holes of the upper mold as a result of said arranging.

9. The method of claim 1, wherein the upper mold is attached to the lower mold as a result of said arranging, and wherein said curing starts immediately after said attaching.

10. The method of claim 9, wherein said pressing starts at the same time as said attaching.

11. The method of claim 1, wherein said inserting results in the resin precursor spreading into every corner of the lower mold cavity.

12. The method of claim 1, wherein said pressing spreads the resin precursor into minute portions of the element and cavity.

13. The method of claim 1, wherein the lower mold temperature is below a curing temperature of the resin precursor during said inserting, arranging, and pressing.

14. The method of claim 13, wherein the lower mold is heated to between 40° C. and 60°, inclusive during said pressing.

15. The method of claim 1, wherein the upper mold temperature is at or above a curing temperature of the resin precursor during said arranging and pressing.

16. The method of claim 1, wherein the lower mold is provided with a cooling mechanism cooling the lower mold after said curing.

* * * * *